(12) United States Patent
Tian

(10) Patent No.: US 11,518,536 B2
(45) Date of Patent: Dec. 6, 2022

(54) VERTICAL TAKEOFF AND LANDING AERIAL VEHICLE AND COOLING SYSTEM

(71) Applicant: Shanghai Autoflight Co., Ltd., Shanghai (CN)

(72) Inventor: Yu Tian, Hong Kong (CN)

(73) Assignee: SHANGHAI AUTOFLIGHT CO., LTD., Shanghai (CN)

( * ) Notice: Subject to any disclaimer, the term of this patent is extended or adjusted under 35 U.S.C. 154(b) by 0 days.

(21) Appl. No.: 17/396,700

(22) Filed: Aug. 8, 2021

(65) Prior Publication Data

US 2021/0362867 A1 Nov. 25, 2021

Related U.S. Application Data

(63) Continuation-in-part of application No. 16/281,020, filed on Feb. 20, 2019, now abandoned.

(30) Foreign Application Priority Data

Aug. 7, 2020 (CN) .......................... 202021631679.1
Oct. 29, 2020 (CN) .......................... 202022448138.1

(51) Int. Cl.
*B64D 33/08* (2006.01)
*B64C 29/00* (2006.01)
*B64D 27/24* (2006.01)
*B64C 11/00* (2006.01)
*B64C 39/02* (2006.01)

(52) U.S. Cl.
CPC .............. *B64D 33/08* (2013.01); *B64C 11/00* (2013.01); *B64C 29/0025* (2013.01); *B64C 39/024* (2013.01); *B64D 27/24* (2013.01); *B64C 2201/042* (2013.01); *B64C 2201/108* (2013.01); *B64C 2201/165* (2013.01)

(58) Field of Classification Search
CPC .... B64D 27/24; B64D 33/08; B64C 29/0016; B64C 29/0025
See application file for complete search history.

(56) References Cited

U.S. PATENT DOCUMENTS

| 9,764,833 B1* | 9/2017 | Tighe ................. B64C 29/0025 |
| 2006/0151666 A1* | 7/2006 | VanderMey .......... B64C 39/062 244/12.3 |
| 2019/0127056 A1* | 5/2019 | Weekes ............... B64C 29/0025 |
| 2021/0155350 A1* | 5/2021 | Kwon ..................... B64C 27/08 |

\* cited by examiner

*Primary Examiner* — Nicholas McFall
(74) *Attorney, Agent, or Firm* — WPAT Law, P.C.; Anthony King

(57) ABSTRACT

A vertical takeoff and landing aerial vehicle and a cooling system for the aerial vehicle. Heat dissipation in an arm of an aerial vehicle is achieved by installing a fan in a hollow interior of each of a left linear support and a right linear support of the aerial vehicle, thereby achieving the purposes of lowering temperature in the arm and protecting equipment in the arm.

10 Claims, 26 Drawing Sheets

VERTICAL TAKEOFF AND LANDING AERIAL VEHICLE AND COOLING SYSTEM

TECHNICAL FIELD

The utility model relates to the technology of unmanned aerial vehicles, and in particular to a vertical takeoff and landing unmanned aerial vehicle and a cooling system for the unmanned aerial vehicle.

BACKGROUND

Heat productivity is large during the working period of a lift motor and an electronic speed controller of an existing vertical takeoff and landing unmanned aerial vehicle, but an arm structure of the existing unmanned aerial vehicle is mostly a closed cavity structure which is not conducive to diffusion of hot air. There is generally no heat dissipation for equipment in the arm during the working period of the lift motor and the electronic speed controller of the existing vertical takeoff and landing unmanned aerial vehicle, which causes a certain influence on the equipment in the arm.

SUMMARY

The utility model relates to a vertical takeoff and landing unmanned aerial vehicle and a cooling system for the unmanned aerial vehicle, which are used for solving the problem that an arm of the unmanned aerial vehicle is poor in heat dissipation.

The utility model provides a vertical takeoff and landing (VTOL) unmanned aerial vehicle, which comprises:

a left main wing and a right main wing;

a left front wing and a right front wing;

a main body which is engaged with the left main wing and the right main wing;

a left linear support for connecting the left main wing with the left front wing;

a right linear support for connecting the right main wing with the right front wing;

the left linear support having a first group of multiple lift propellers arranged thereon;

the right linear support having a second group of multiple lift propellers arranged thereon;

wherein the left linear support and the right linear support each have a hollow interior;

at least one air inlet which is provided on each of the left linear support and the right linear support;

at least one air outlet which is provided on each of the left linear support and the right linear support; and a fan which is arranged in the hollow interior of each of the left linear support and the right linear support.

In one embodiment of the utility model, the fan is arranged at a position close to the front end of each of the left linear support and the right linear support.

In one embodiment of the utility model, the unmanned aerial vehicle further comprises a plurality of motors which are arranged in the hollow interiors;

In one embodiment of the utility model, a diameter or width of each air inlet in the at least one air inlet is less than a radius of each of the left linear support and the right linear support.

In one embodiment of the utility model, two ends of each of the left linear support and the right linear support are formed as a tapered structure.

In one embodiment of the utility model, the air inlets are located at the front ends of the left linear support and the right linear support, and the air outlets are located at the rear ends of the left linear support and the right linear support.

A plurality of air inlets in a shape of oblong are provided, the length directions of the air inlets are provided along a generatrix of the tapered structure, and the plurality of air inlets are spaced from one another; a plurality of air outlets in a shape of oblong are provided, length directions of the air outlets are provided along a generatrix of the tapered structure in a spaced manner, and the plurality of air outlets are spaced from one another.

In one embodiment of the utility model, the unmanned aerial vehicle further comprises a detachable pod attached to the bottom face of the unmanned aerial vehicle.

In one embodiment of the utility model, the pod is a passenger pod or a cargo pod.

In one embodiment of the utility model, a rotating shaft of the fan is perpendicular to a rotating shaft of each lift propeller in the plurality of the plurality of lift propellers.

In one embodiment of the utility model, the unmanned aerial vehicle further comprises at least one propulsion propeller arranged on the unmanned aerial vehicle.

The utility model further provides a cooling system for an unmanned aerial vehicle, which comprises:

a hollow linear support;

a plurality of lift propellers which are arranged on the linear support;

a plurality of motors for driving the lift propellers, wherein the plurality of motors are arranged in the hollow linear support;

at least one air inlet which is provided on the linear support;

at least one air outlet which is provided on the linear support;

a fan which is arranged in the linear support to supply air from an external environment to the interior of the hollow linear support; and wherein a diameter or width of each air inlet in the at least one air inlet is less than a radius of the linear support.

In one embodiment of the utility model, the fan is arranged at a position close to the front end of the linear support.

In one embodiment of the utility model, the linear support is in a straight configuration.

In one embodiment of the utility model, the at least one air inlet is provided at a position close to the front end of the linear support.

In one embodiment of the utility model, the at least one air outlet is provided at a position close to the rear end of the linear support.

In one embodiment of the utility model, the cooling system further comprises a pod detachably connected to the bottom face of the unmanned aerial vehicle.

In one embodiment of the utility model, the pod is a passenger pod or a cargo pod.

The utility model provides a vertical takeoff and landing unmanned aerial vehicle, which comprises: a left main ring and a right main wing; a left front wing and a right front wing; a main body which is engaged with the left main wing and the right main wing; a left linear support for connecting the left main wing with the left front wing; a right linear support for connecting the right main wing with the right front wing; the left linear support having a first group of multiple lift propellers arranged thereon, the right linear support having a second group of multiple lift propellers arranged thereon; wherein the left linear support and the right linear support each have a hollow interior; at least one air inlet which is provided on each of the left linear support and the right linear support; at least one air outlet which is provided on each of the left linear support and the right linear support; and a fan which is arranged in the hollow interior of each of the left linear support and the right linear support. According to the vertical takeoff and landing unmanned aerial vehicle provided by the utility model, heat dissipation in an arm of an unmanned aerial vehicle is achieved by installing a fan in a hollow interior of each of a left linear support and a right linear support of the unmanned aerial vehicle, thereby achieving the purposes of lowering temperature in the arm and protecting equipment in the arm.

Although this specification includes many specific implementation details, these should not be construed as limitations on the scope of any utility model or of what may be claimed, but rather as descriptions specific to features of particular implementations of particular embodiments. Certain features that are described in the context of different implementations in this specification may also be implemented in combination in a separate implementation. In contrast, various features described in the context of the separate implementation may also be implemented in multiple implementations separately or in any appropriate sub-combination. In addition, although the features may be described above and below as acting in certain combinations and even initially described as such, one or more features from a described/claimed combination may be excised from the combination in certain cases, and the described/claimed combination may be directed to a sub-combination or variations of the sub-combination.

Many implementations have been described. However, it should be understood that various modifications may be made without departing from the spirit and scope of the utility model. For example, the example operations, methods, or processes described herein may comprise more steps or less steps than those described. In addition, the steps in these example operations, methods, or processes may be performed in different alternative ways than those described or illustrated in the figures.

The details of one or more implementations of a subject matter described in the utility model are set forth in the accompanying drawings and the description below. Other features, aspects and advantages of the subject matter will become apparent in accordance with the specification, the accompanying drawings, and the claims.

BRIEF DESCRIPTION OF THE DRAWINGS

It should be noted that the accompanying drawings may be in simplified form and may not be precise in scale. With reference to the disclosure herein, for purposes of convenience and clarity only, directional terms such as top, bottom, left, right, up, down, upper side, above, beneath, below, rear portion, front portion, distal end, and proximal end are used with reference to the accompanying drawings. These directional terms should not be construed to limit the scope of the embodiments in any way.

FIG. 1b is a sectional view of a side portion of the unmanned aircraft system of FIG. 1a;

Where reference is made to components with reference numerals, like parts are denoted by the same reference numerals throughout the accompanying drawings of the specification:

Figure 1A:
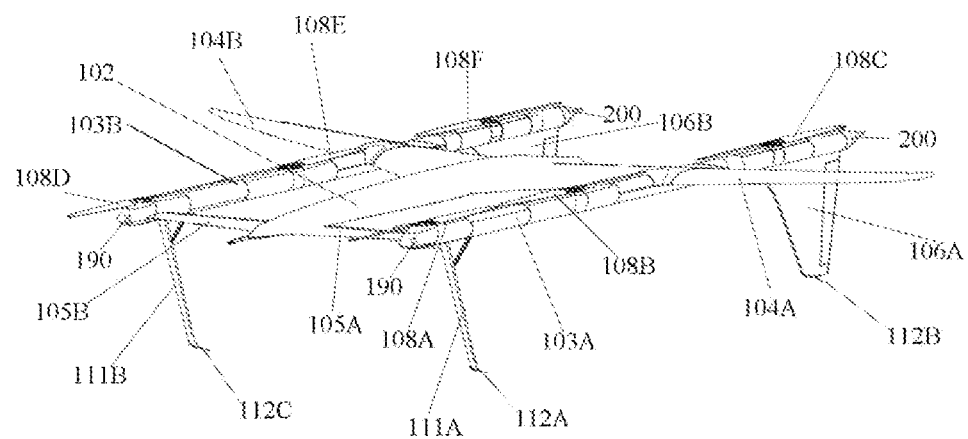
FIG. 1a is a top perspective view of an embodiment of a VTOL (vertical takeoff and landing) unmanned aircraft system with a flight platform and a fan in accordance with one aspect of an embodiment.

100—unmanned aerial vehicle; 101—flight platform; 102—main body; 103A—left linear support; 103B—right linear support; 104A—left main wing; 104B—right main wing; 105A—left front wing; 105B—right front wing; 106A—left vertical stabilizer; 106B—right vertical stabilizer; 107—propulsion propeller; 107A—left propulsion propeller; 107B—right propulsion propeller; 108A—first lift propeller; 108B—second lift propeller; 108C—third lift propeller; 108D—fourth lift propeller; 108E—fifth lift propeller; 108F—sixth lift propeller; 109A—left wingtip propeller; 109B—right wingtip propeller; 110A—left wingtip vertical stabilizer; 110B—right wingtip vertical stabilizer; 111A—left folding leg; 111B—right folding leg; 112A—first leaf spring; 112B—second leaf spring; 112C—third leaf spring; 112D—fourth leaf spring; 116—vertical expander; 117—central propulsion propeller; 130—cargo pod; 135A—first pod leaf spring; 135B—second pod leaf spring; 135C—third pod leaf spring; 135D—fourth pod leaf spring; 140—passenger pod; 145A—pod leg; 145B—pod leg; 145C—pod leg; 145D—pod leg; 147—pod-attaching latch; 148—electric wheel; 149—shell; 150—energy storage unit in flight platform; 155—energy storage unit in pod; 160—flotation device; 170—fan; 180—motor; 190—air inlet; 200—air outlet; 201—aileron; A—airflow direction; B—air inlet direction; C—air outlet direction.

DETAILED DESCRIPTION OF THE EMBODIMENTS

Different aspects of various embodiments may now be better understood by turning to the following detailed description of the embodiments, which are presented as illustrative examples of the embodiments defined in the technical solutions. It is expressly understood that the embodiments defined by the technical solutions may be broader than the illustrated embodiments described below.

The words used in the specification to describe the various embodiments should be understood to not only have commonly defined meanings thereof, but, in structures, materials, or actions in the specification, to include special definitions beyond the scope of the generally defined meanings. Hence, if a component may be understood in the context of the specification to include more than one meaning, its use in the technical solution must be understood to be general for all possible meanings supported by the specification and the words themselves.

The term "unmanned aerial vehicle" is defined as a flight transportation system with at least one propeller as one propulsion source. The term "unmanned aerial vehicle" may comprise both "manned" and "unmanned" flight transportation systems. The "manned" unmanned aerial vehicle may refer to a flight transportation system that carries human passengers, none of which has right of control over the unmanned aerial vehicle. The "manned" unmanned aerial vehicle may also refer to a flight transportation system that carries human passengers, with some or one of the human passengers having a certain right of control over the unmanned aerial vehicle.

As the background, during the working period of a lift motor and an electronic speed controller of an existing vertical takeoff and landing unmanned aerial vehicle, there is no special equipment for heat dissipation of equipment in an arm, thus causing a certain influence on the equipment in the arm. To solve the problem that an arm of an unmanned aerial vehicle is poor in heat dissipation, the utility model provides a vertical takeoff and landing unmanned aerial vehicle, which comprises: a left main ring and a right main wing; a left front wing and a right front wing; a main body which is engaged with the left main wing and the right main wing; a left linear support for connecting the left main wing with the left front wing; a right linear support for connecting the right main wing with the right front wing; the left linear support having a first group of multiple lift propellers arranged thereon, the right linear support having a second group of multiple lift propellers arranged thereon, and the left linear support and the right linear support each have a hollow interior; at least one air inlet which is provided on each of the left linear support and the right linear support; at least one air outlet which is provided on each of the left linear support and the right linear support; and a fan which is arranged in the hollow interior of each of the left linear support and the right linear support.

The technical solutions of the utility model will be described below in detail in conjunction with specific accompanying drawings.

Figure 1B:
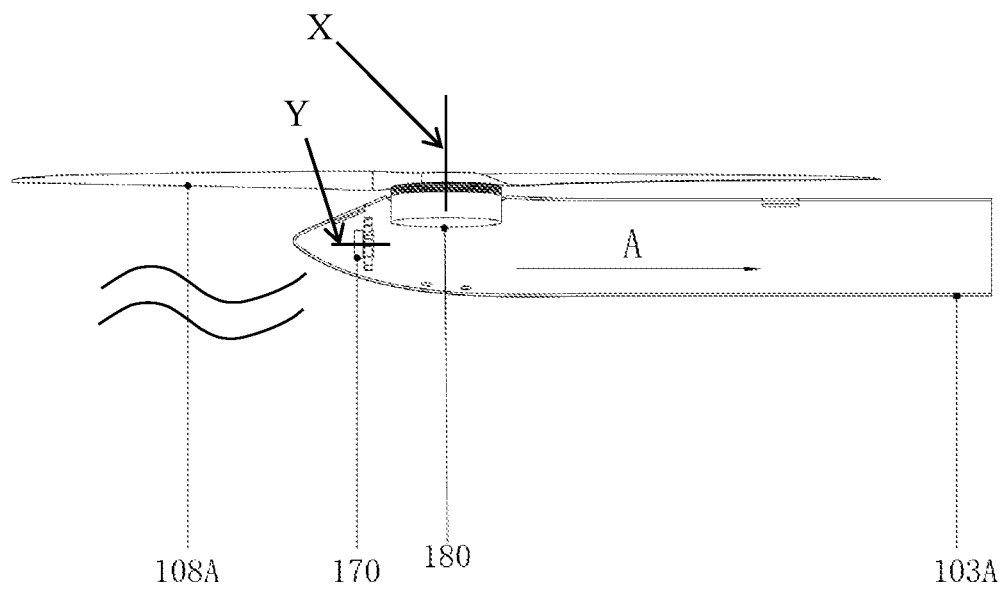
Figure 1C:
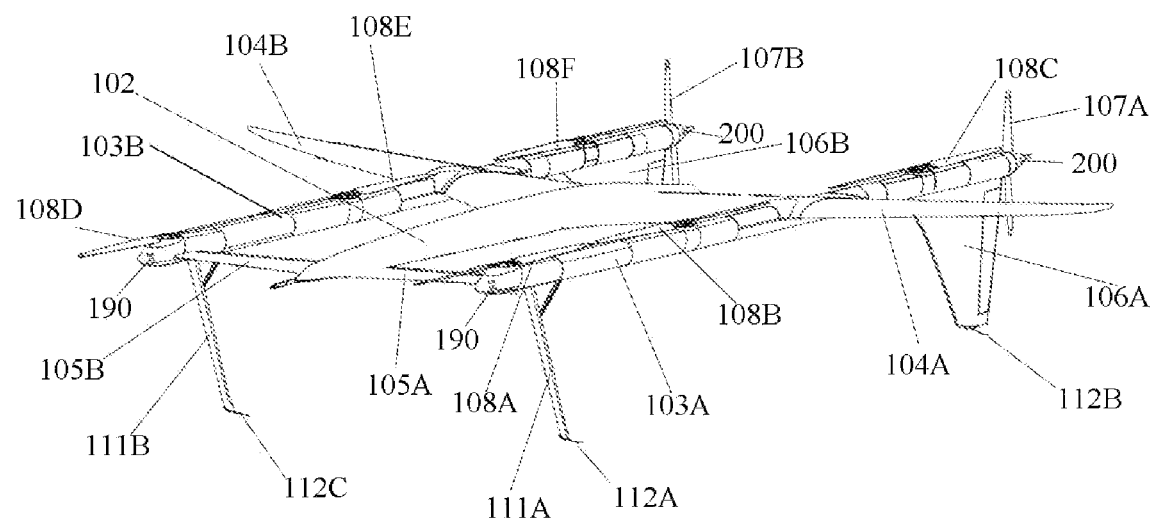
FIG. 1c is a top perspective view of an embodiment of a VTOL unmanned aircraft system with a flight platform and a fan in accordance with still another aspect of an embodiment.
Figure 1D:
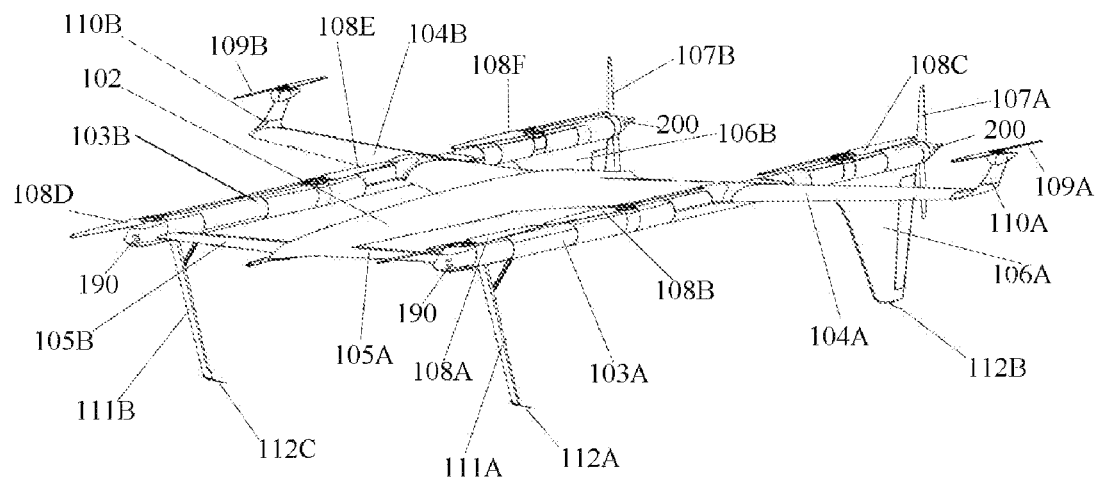
FIG. 1d is a top perspective view of an embodiment of a VTOL unmanned aircraft system with a flight platform and a fan in accordance with still another aspect of the embodiment.
Figure 2:
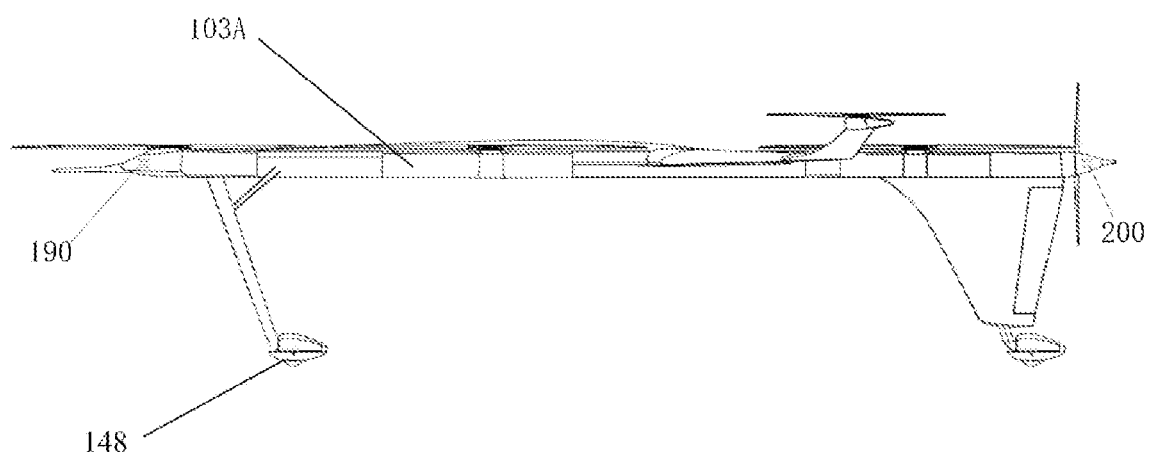
FIG. 2 is a side view of air inlets and air outlets of an unmanned aircraft system in accordance with one aspect of an embodiment.
Figure 3:
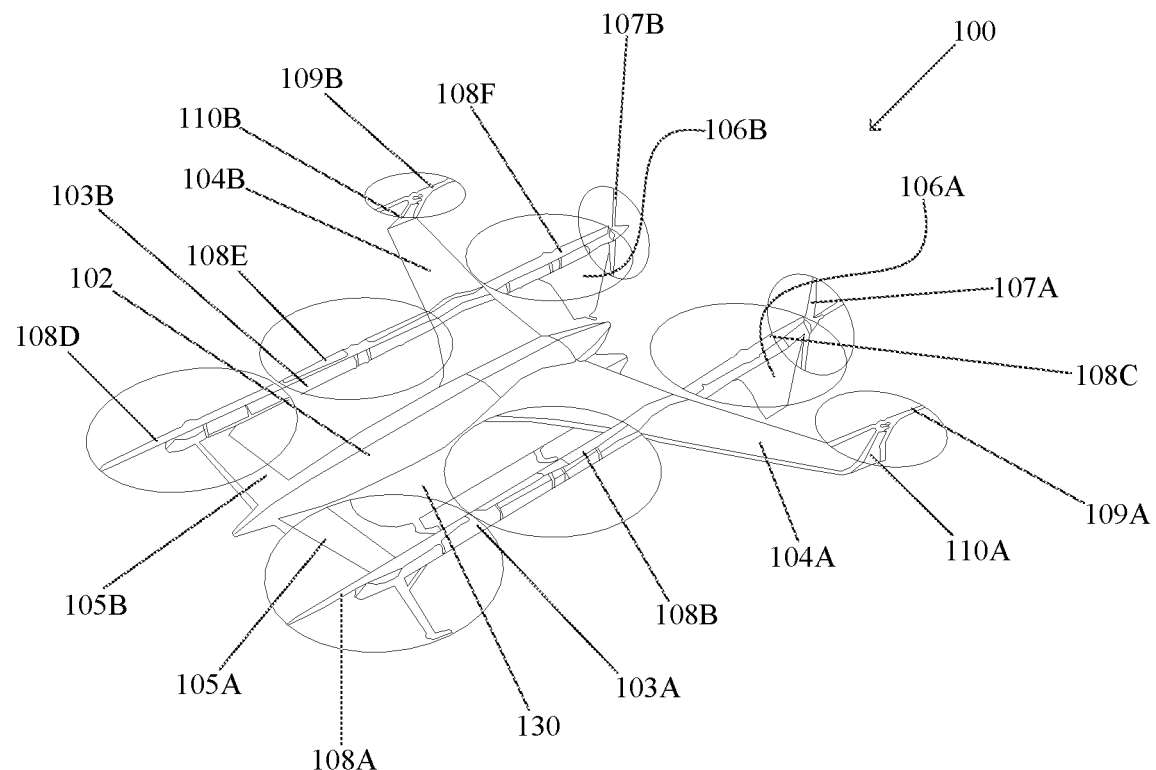
FIG. 3 is a top perspective view of an embodiment of an unmanned aircraft system in accordance with still another aspect of an embodiment.
Figure 4:
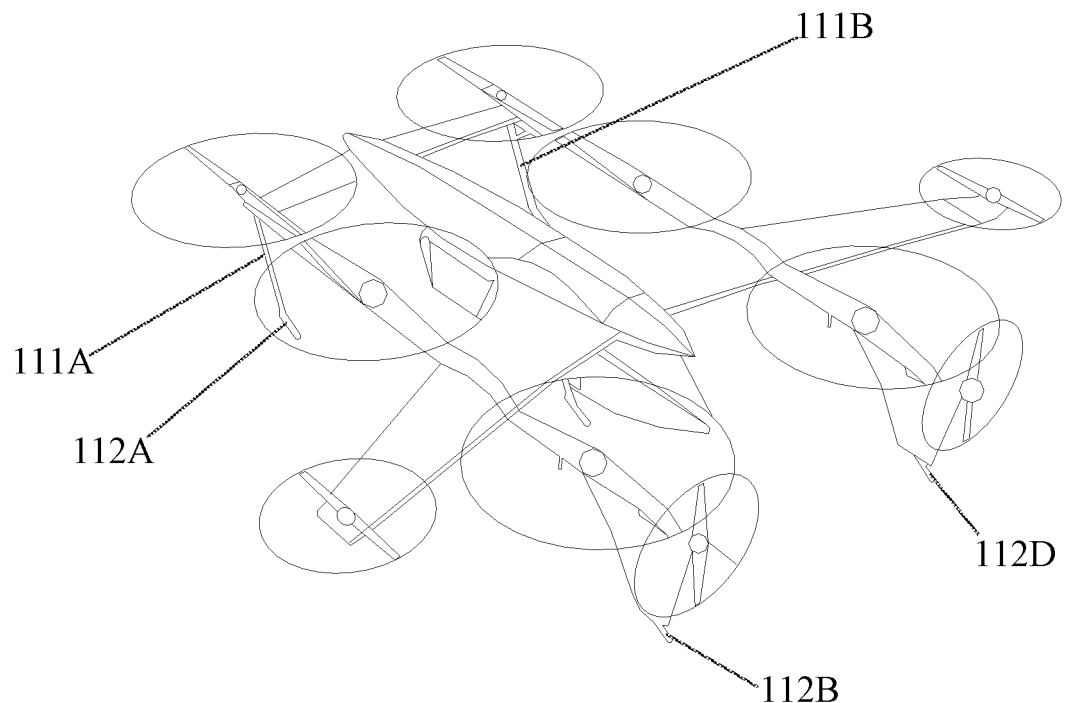
FIG. 4 is a top rear perspective view of the unmanned aircraft system of FIG. 3.
Figure 5:
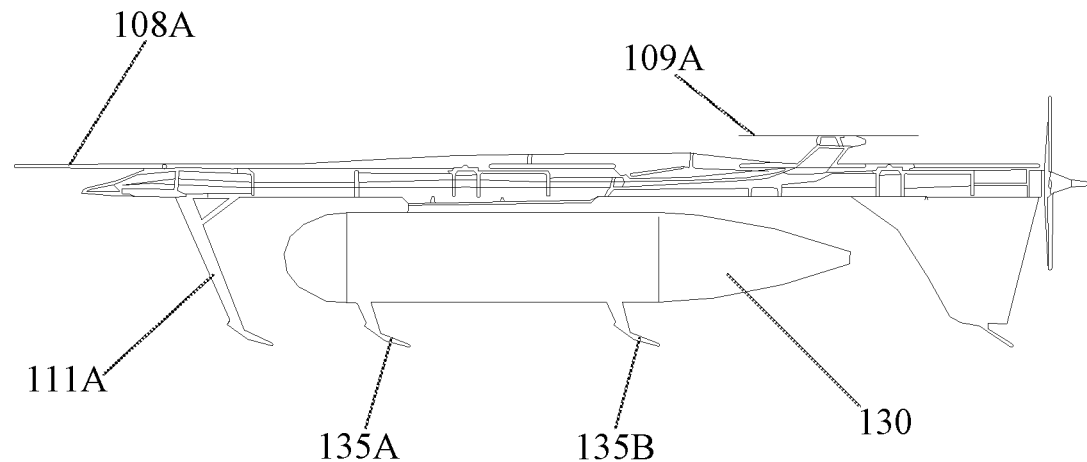
FIG. 5 is a side view of the unmanned aircraft system of FIG. 3.
Figure 6:
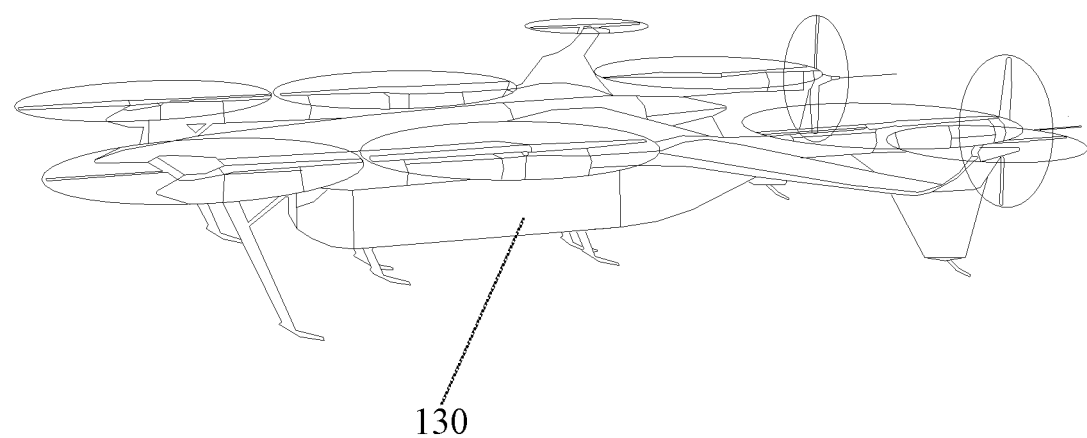
FIG. 6 is a top perspective view of another embodiment of a VTOL unmanned aircraft system with a flight platform and a detachably attached pod in accordance with one aspect of the embodiment.
Figure 7:
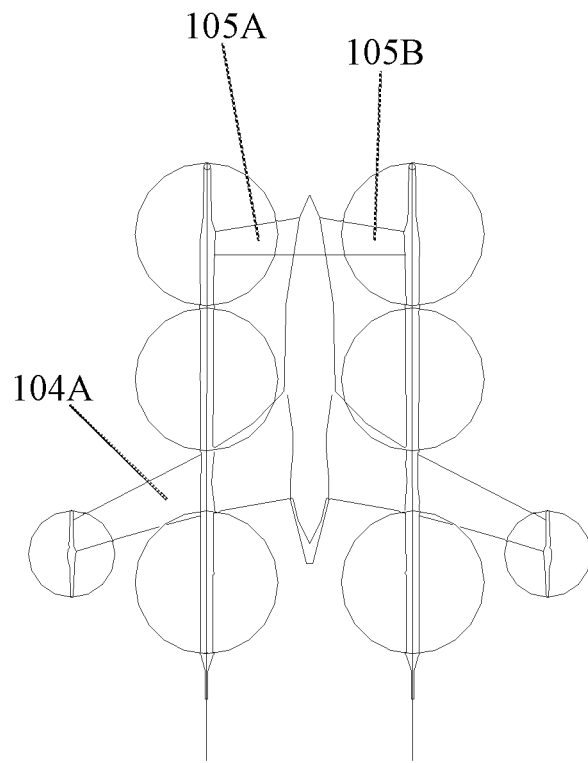
FIG. 7 is a top view of the unmanned aircraft system of FIG. 6 in accordance with one aspect of the embodiment.
Figure 8:
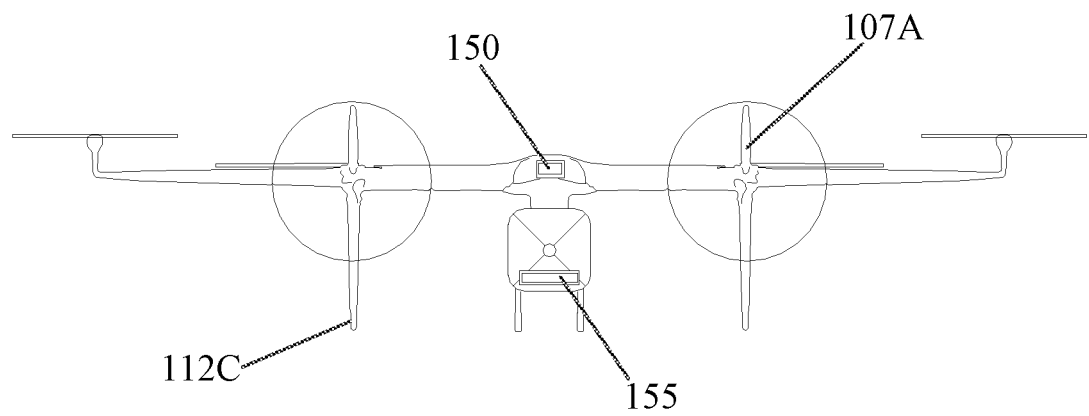
FIG. 8 is a front view of the unmanned aircraft system of FIG. 6 in accordance with one aspect of the embodiment.
Figure 9:
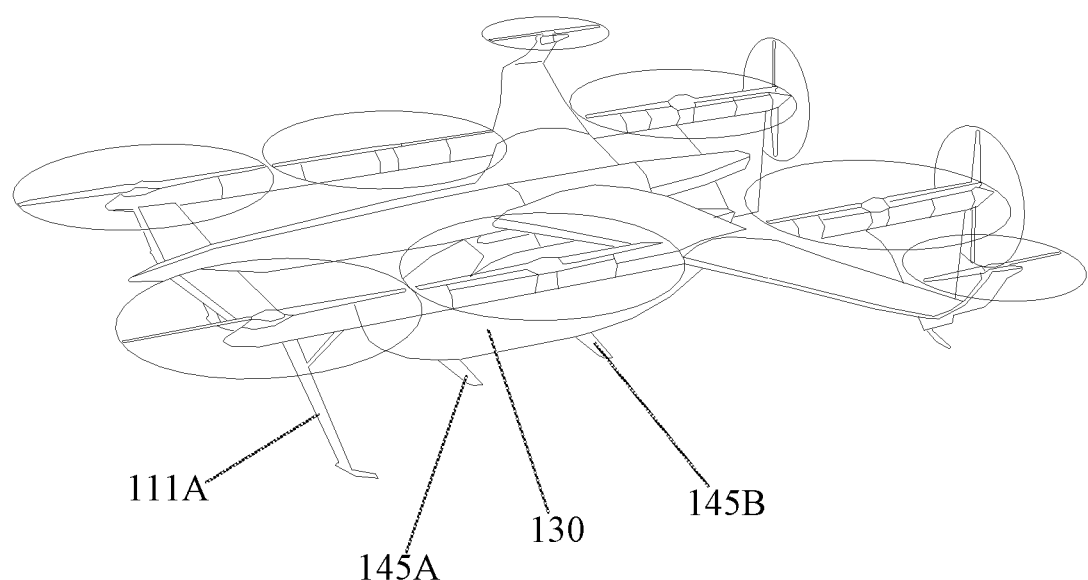
FIG. 9 is a top perspective view of an embodiment of a VTOL unmanned aircraft system with a flight platform and a detachably attached passenger pod in accordance with one aspect of the embodiment.
Figure 10:
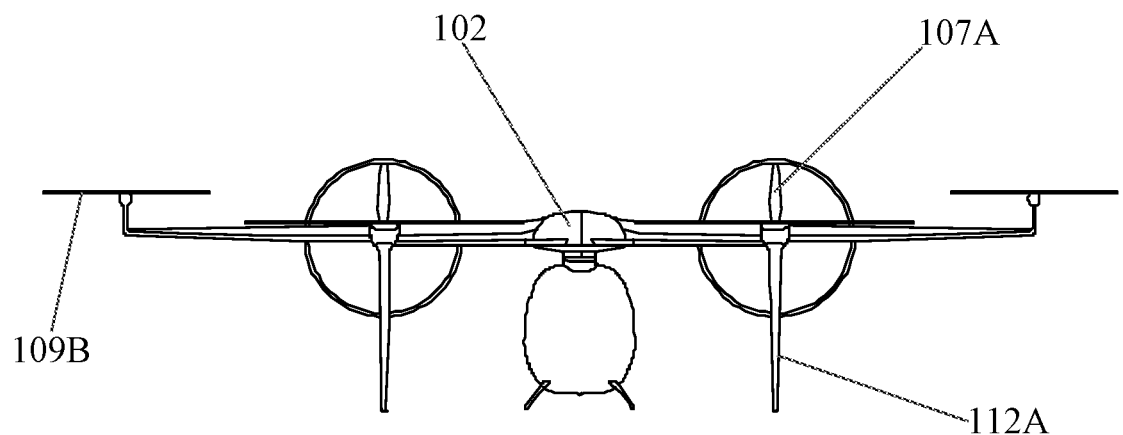
FIG. 10 is a front view of the unmanned aircraft system of FIG. 9 in accordance with one aspect of the embodiment.
Figure 11:
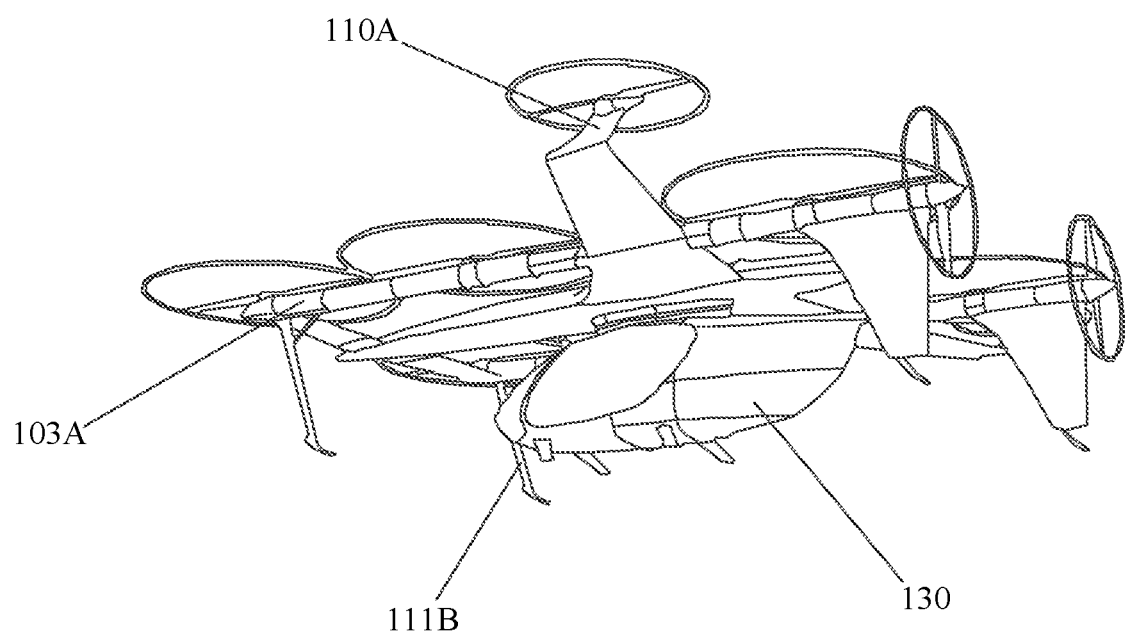
FIG. 11 is a rear perspective view of the unmanned aircraft system of FIG. 9 in accordance with one aspect of the embodiment.
Figure 12:
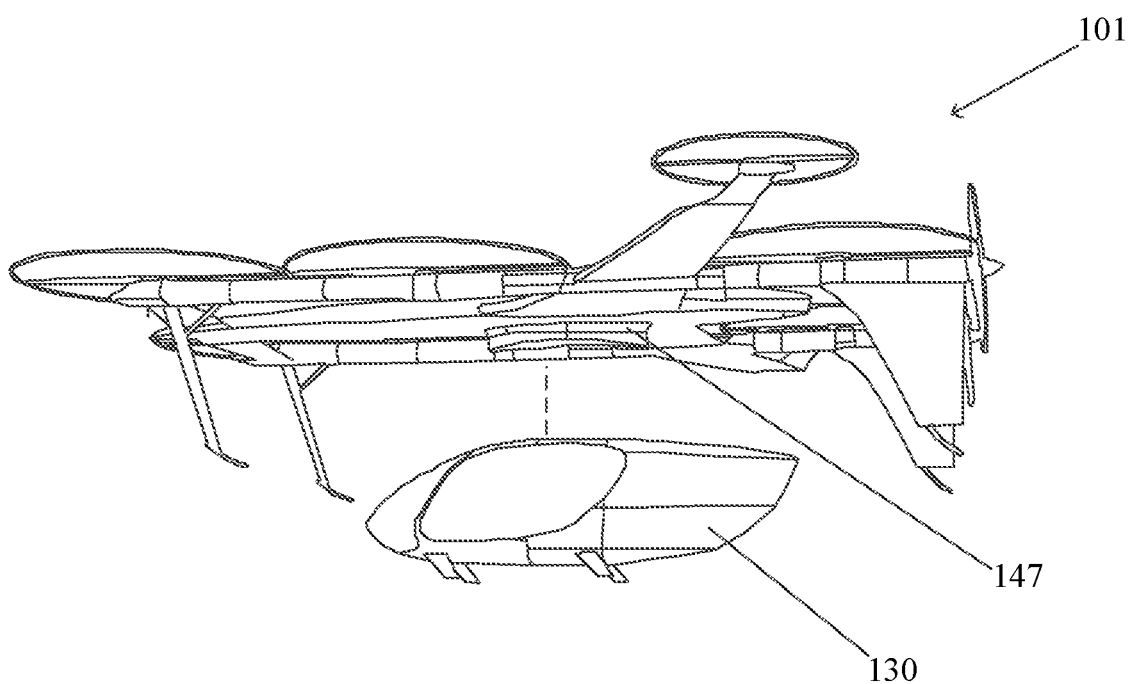
FIG. 12 is a side perspective view of the unmanned aircraft system of FIG. 9 in accordance with one aspect of the embodiment, wherein the passenger pod is detached from the flight platform and parked on the ground.
Figure 13:
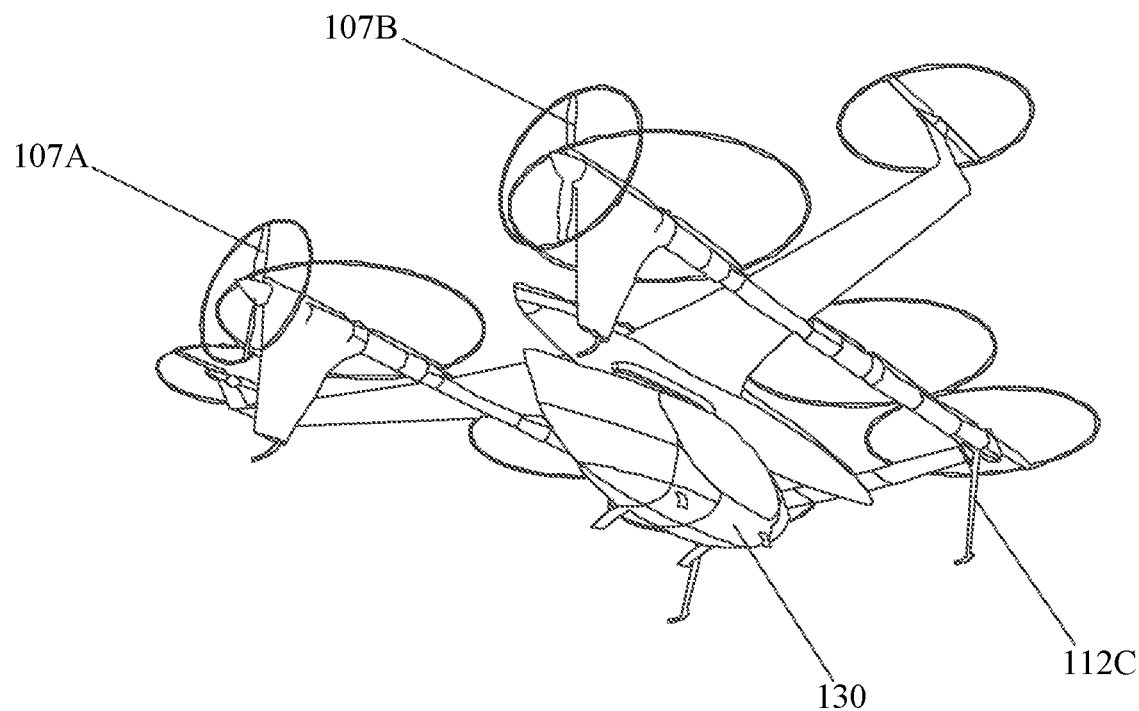
FIG. 13 is a rear perspective view of the embodiment of FIG. 9 in accordance with one aspect of the embodiment.
Figure 14:
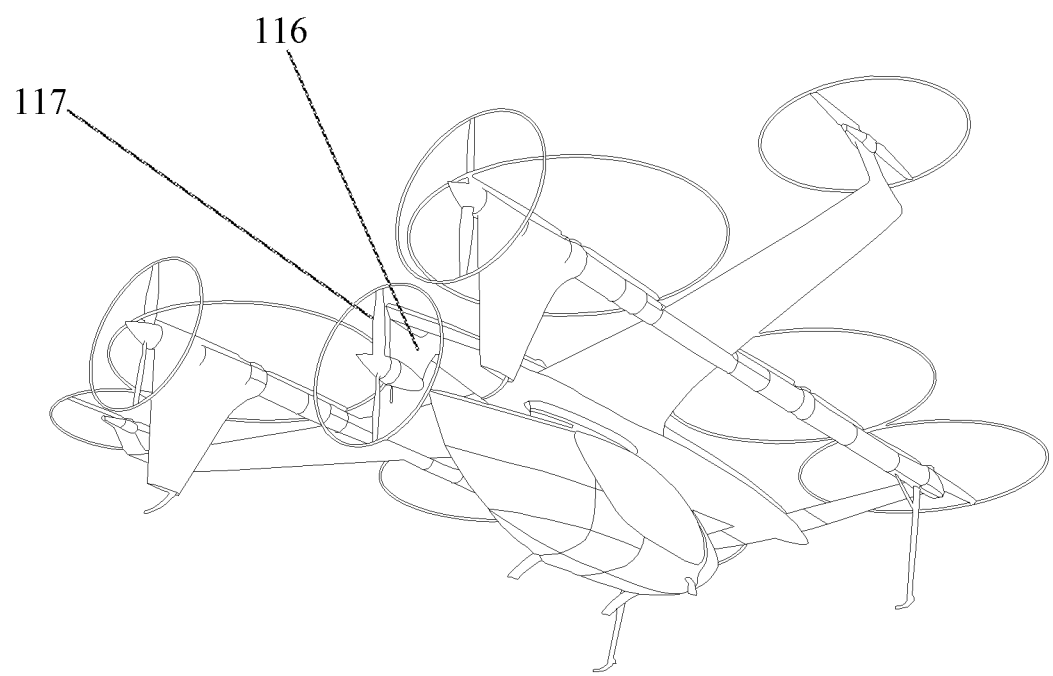
FIG. 14 is a rear perspective view of another embodiment in accordance with one aspect of the embodiment.
Figure 15:
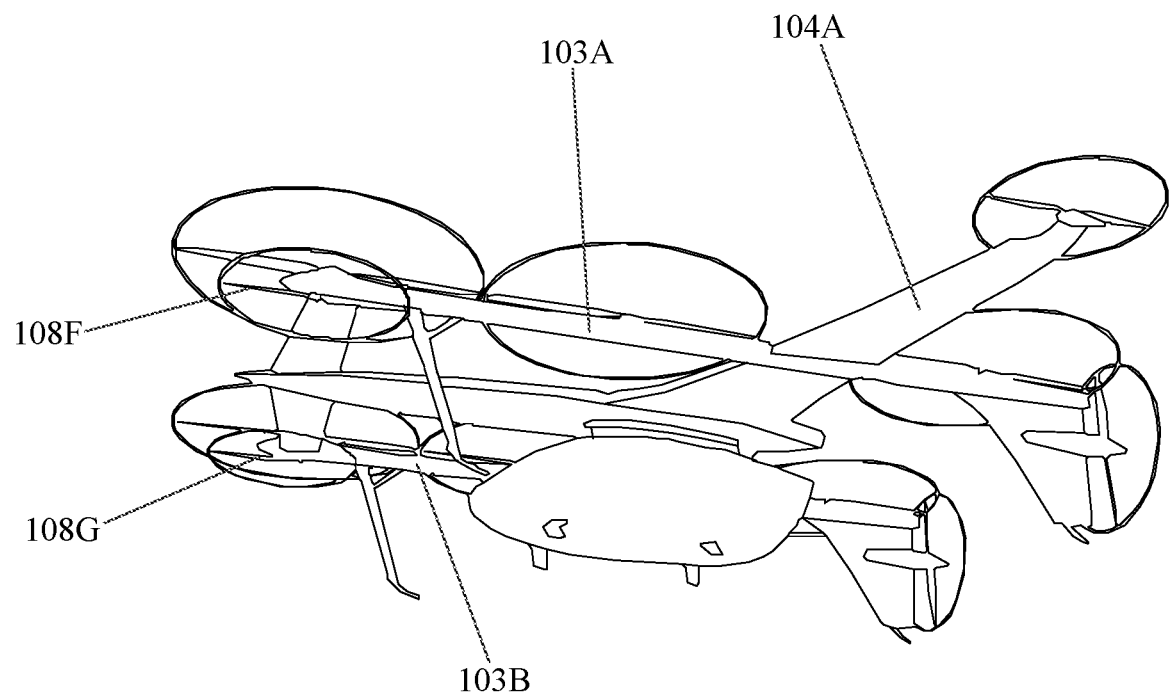
FIG. 15 is a side bottom perspective view of still another embodiment of an unmanned aircraft system in accordance with one aspect of the embodiment.
Figure 16:
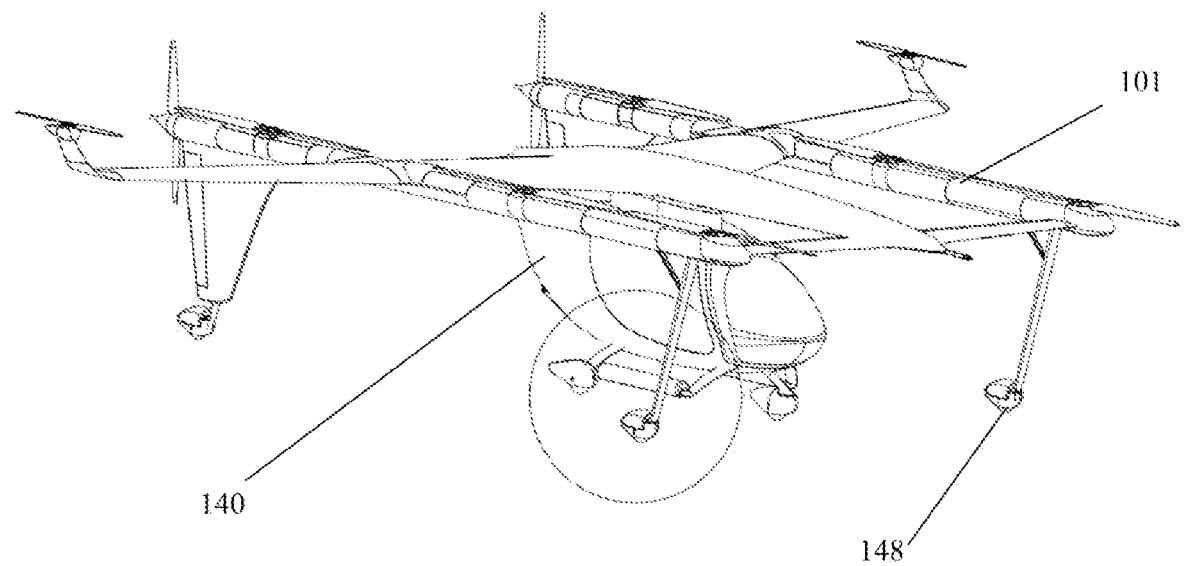
FIG. 16 is a perspective view of one embodiment of an unmanned aircraft system in accordance with another aspect of the embodiment.
Figure 17:
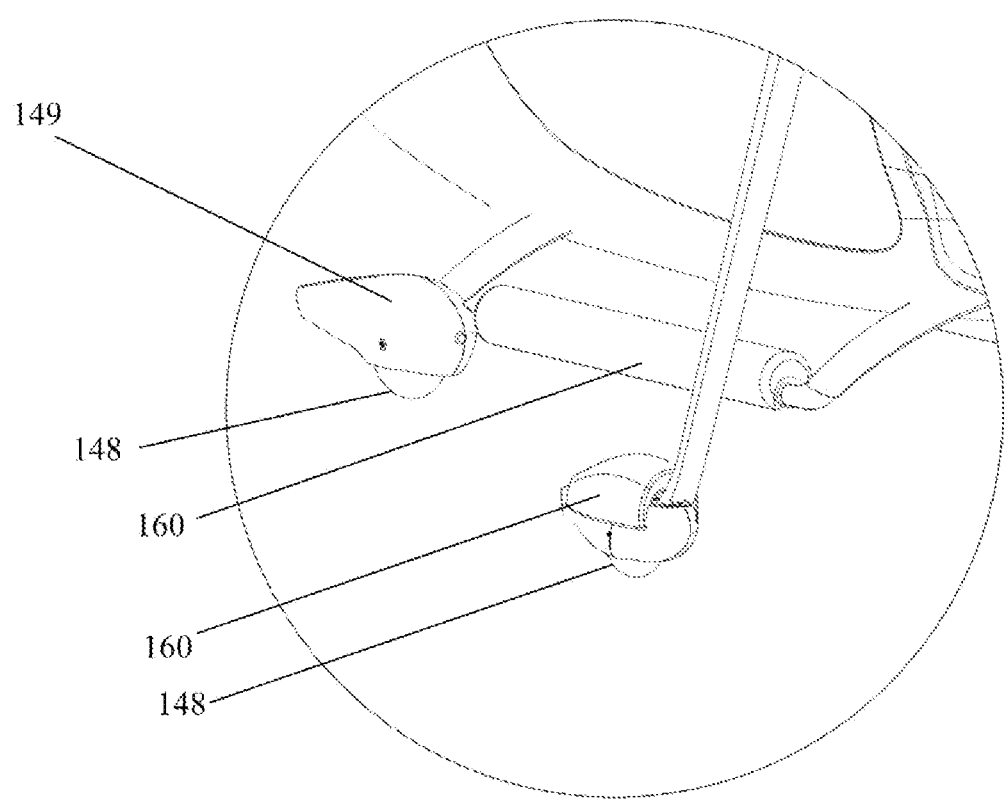
FIG. 17 is a close-up view of an encircled region in FIG. 16 in accordance with another aspect of the embodiment.
Figure 18:
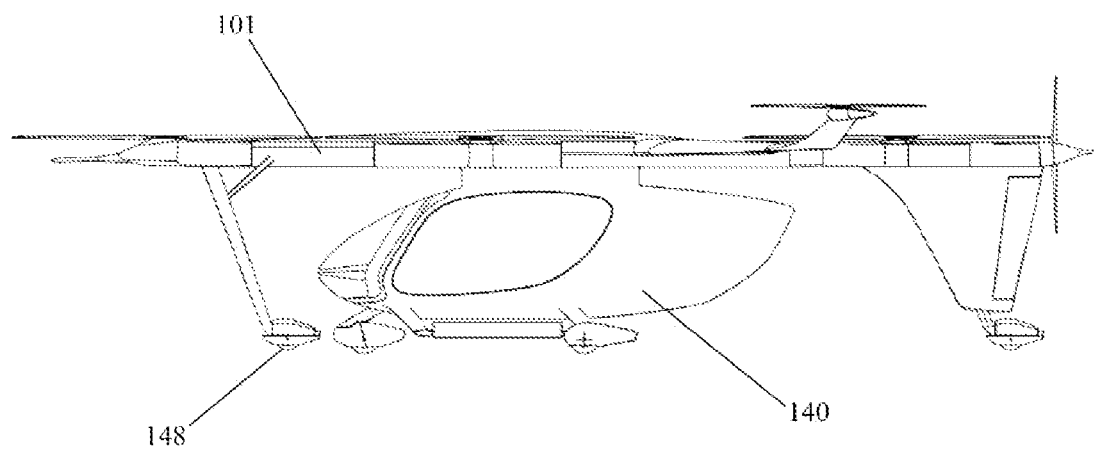
FIG. 18 is a side view of one embodiment of an unmanned aircraft system in accordance with another aspect of the embodiment.
Figure 19:
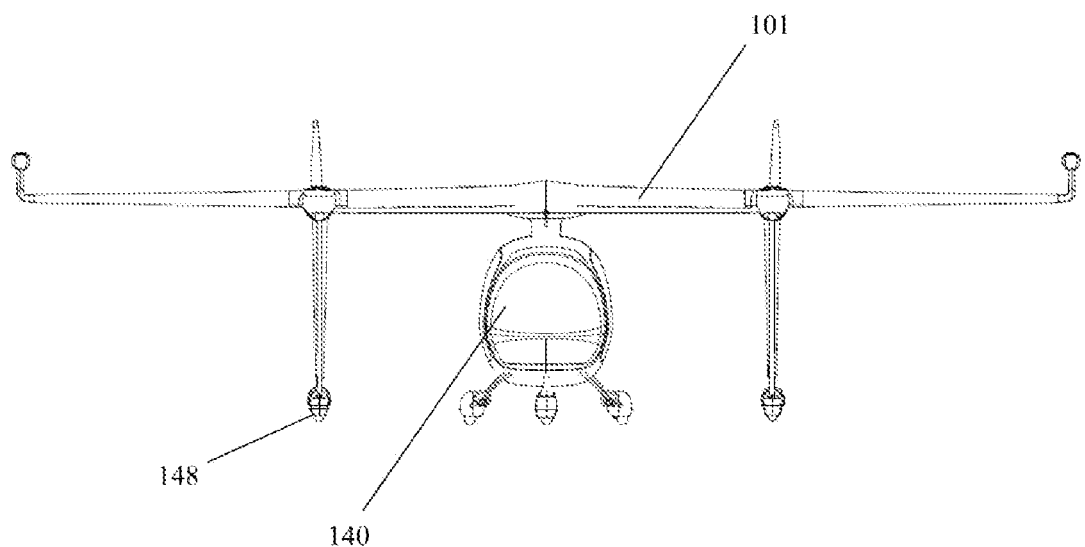
FIG. 19 is a front view of one embodiment of an unmanned aircraft system in accordance with another aspect of the embodiment.
Figure 20:
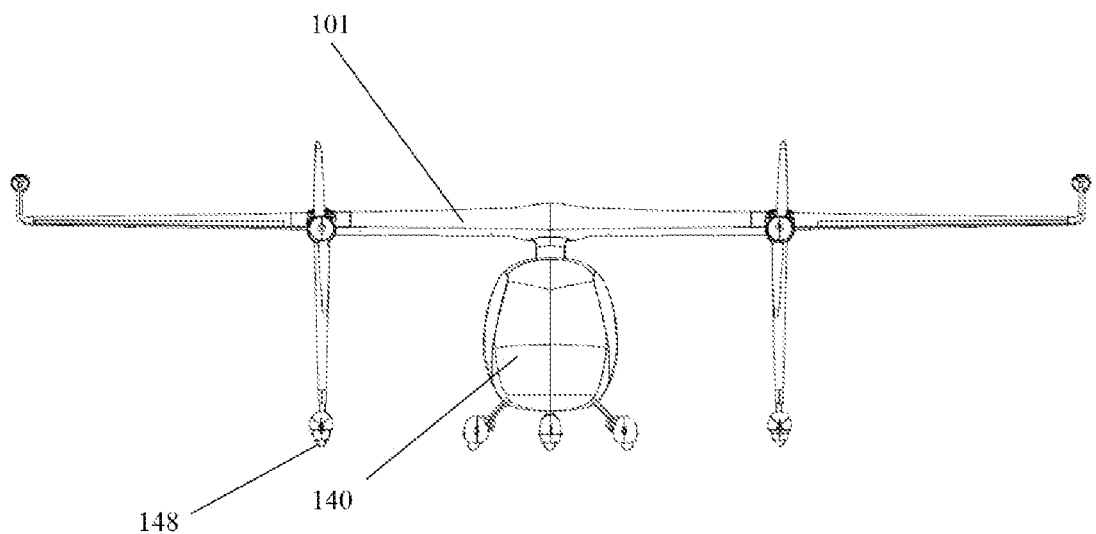
FIG. 20 is a rear view of one embodiment of an unmanned aircraft system in accordance with another aspect of the embodiment.
Figure 21:
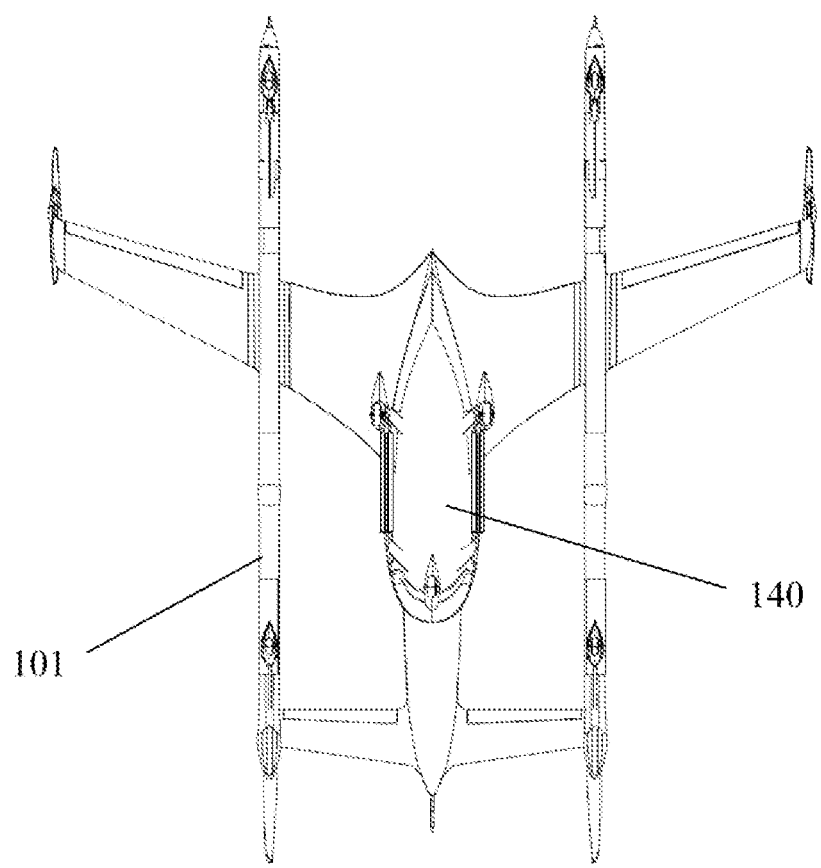
FIG. 21 is an upward view of one embodiment of an unmanned aircraft system in accordance with another aspect of the embodiment.
Figure 22:
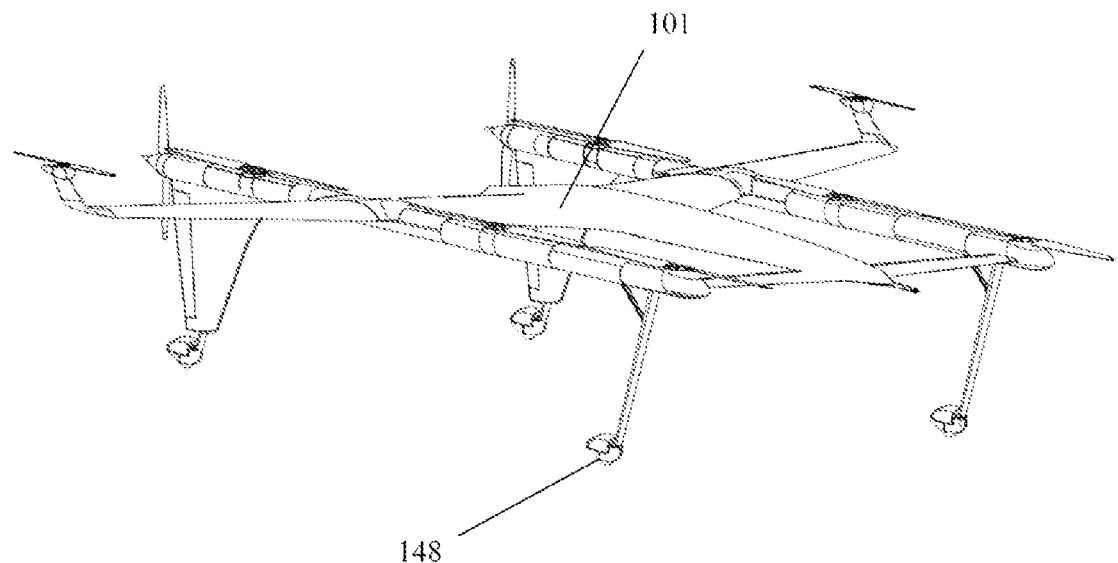
FIG. 22 is a perspective view of another embodiment of a flight platform in accordance with another aspect of the embodiment.
Figure 23:
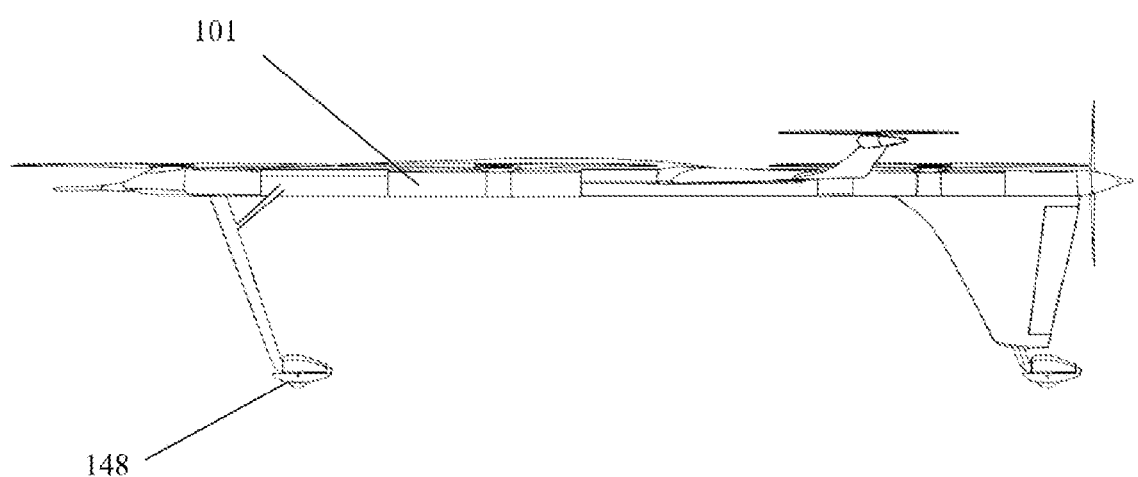
FIG. 23 is a side view of another embodiment of a flight platform in accordance with another aspect of the embodiment.
Figure 24:
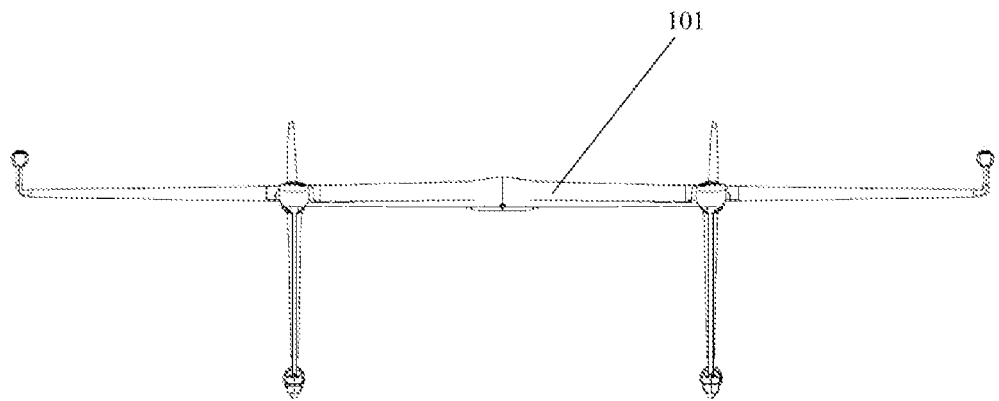
FIG. 24 is a front view of another embodiment of a flight platform in accordance with another aspect of the embodiment.
Figure 25:
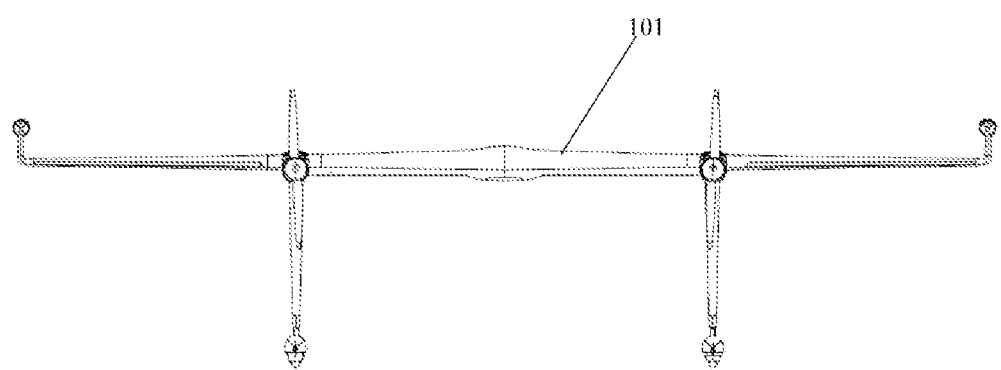
FIG. 25 is a rear view of another embodiment of a flight platform in accordance with another aspect of the embodiment.
Figure 26:
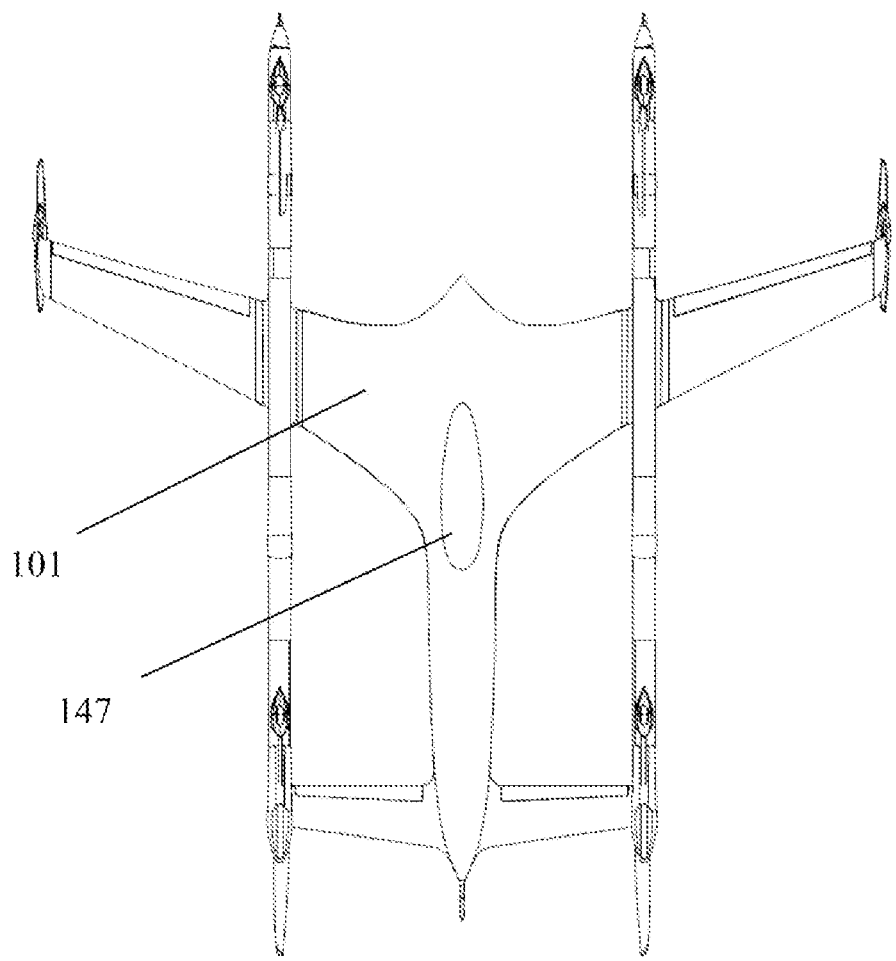
FIG. 26 is an upward view of another embodiment of a flight platform in accordance with another aspect of the embodiment.
Figure 27:
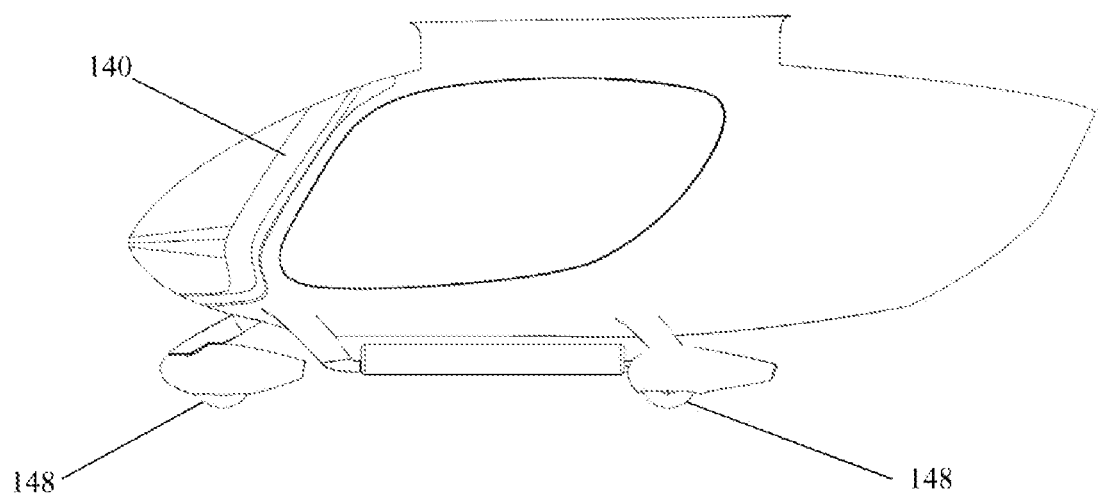
FIG. 27 is a side view of another embodiment of a passenger pod in accordance with another aspect of the embodiment.
Figure 28:
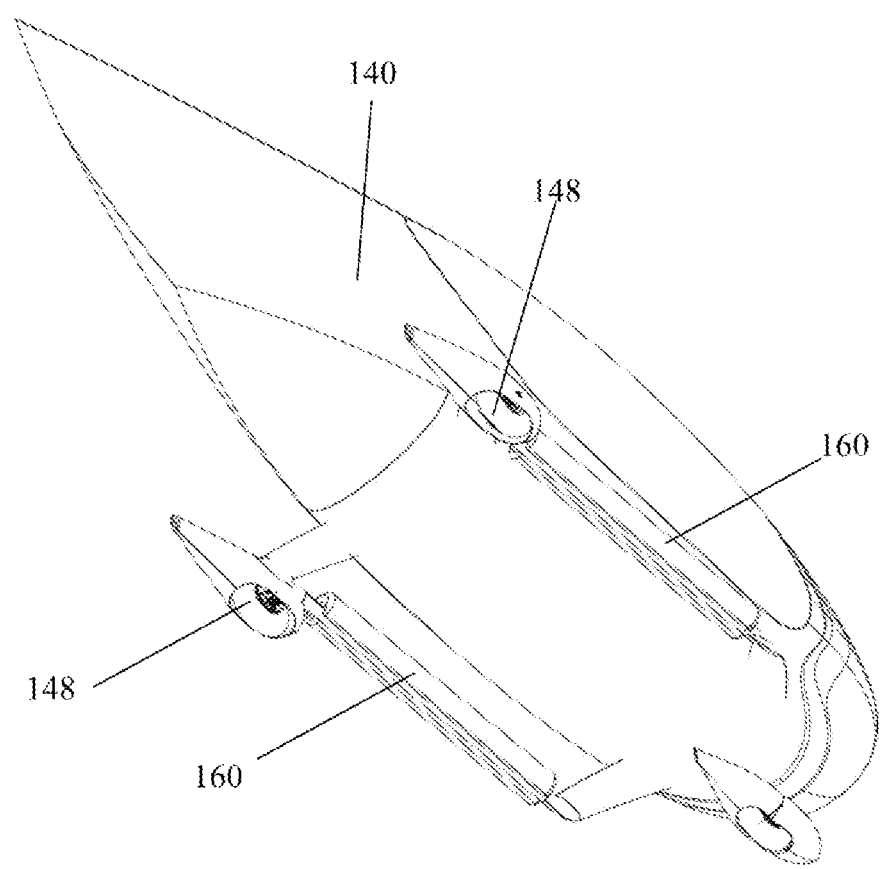
FIG. 28 is a bottom perspective view of another embodiment of a passenger pod in accordance with another aspect of the embodiment.
Figure 29:
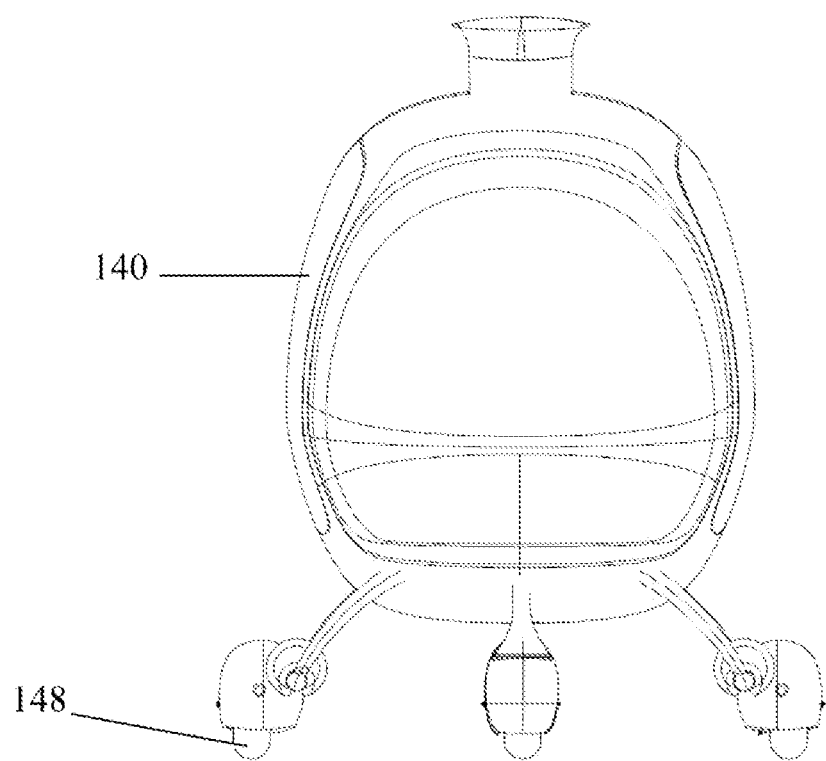
FIG. 29 is a front view of another embodiment of a passenger pod in accordance with another aspect of the embodiment.
Figure 30:
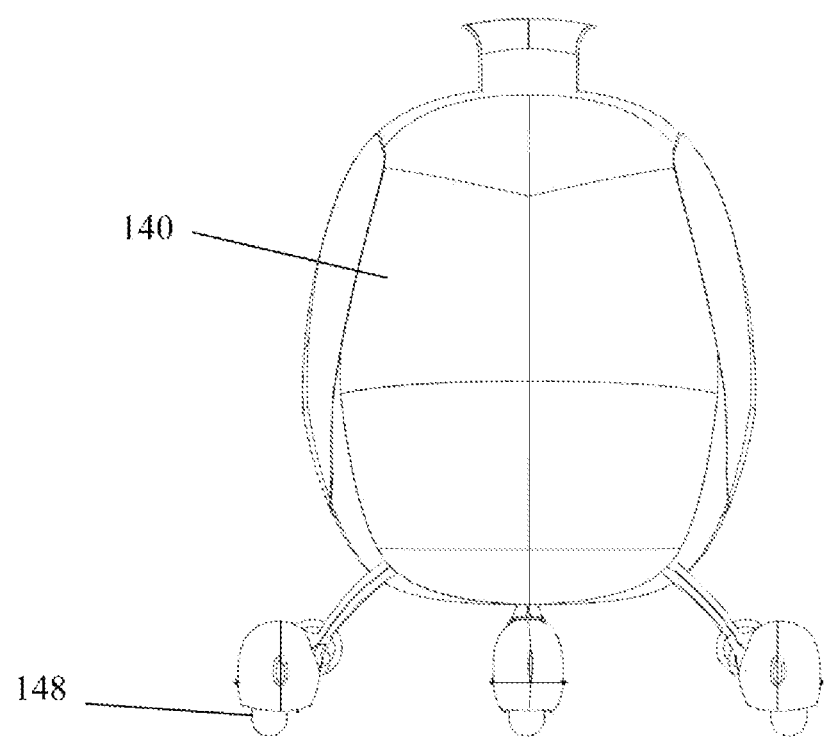
FIG. 30 is a rear view of another embodiment of a passenger pod in accordance with another aspect of the embodiment.
Figure 31:
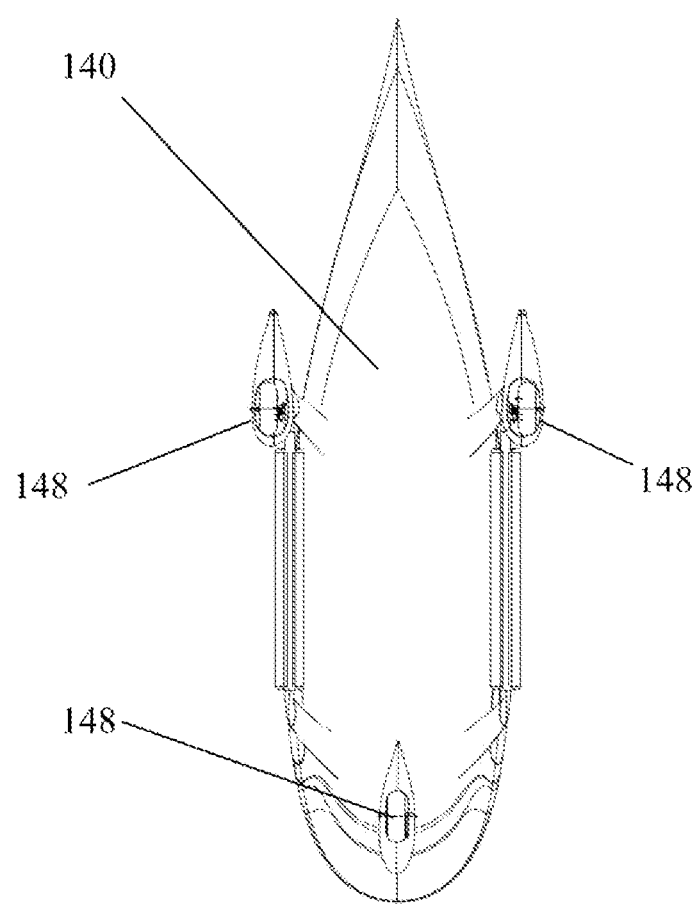
FIG. 31 is an upward view of another embodiment of a passenger pod in accordance with another aspect of the embodiment.
Figure 32:
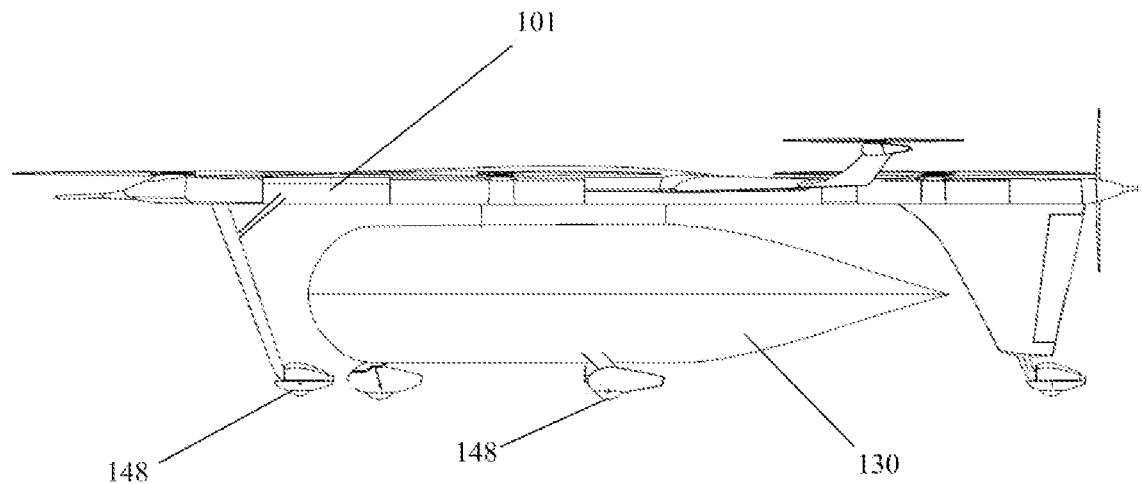
FIG. 32 is a side view of another embodiment of a flight platform attached to a cargo pod in accordance with another aspect of the embodiment.
Figure 33:
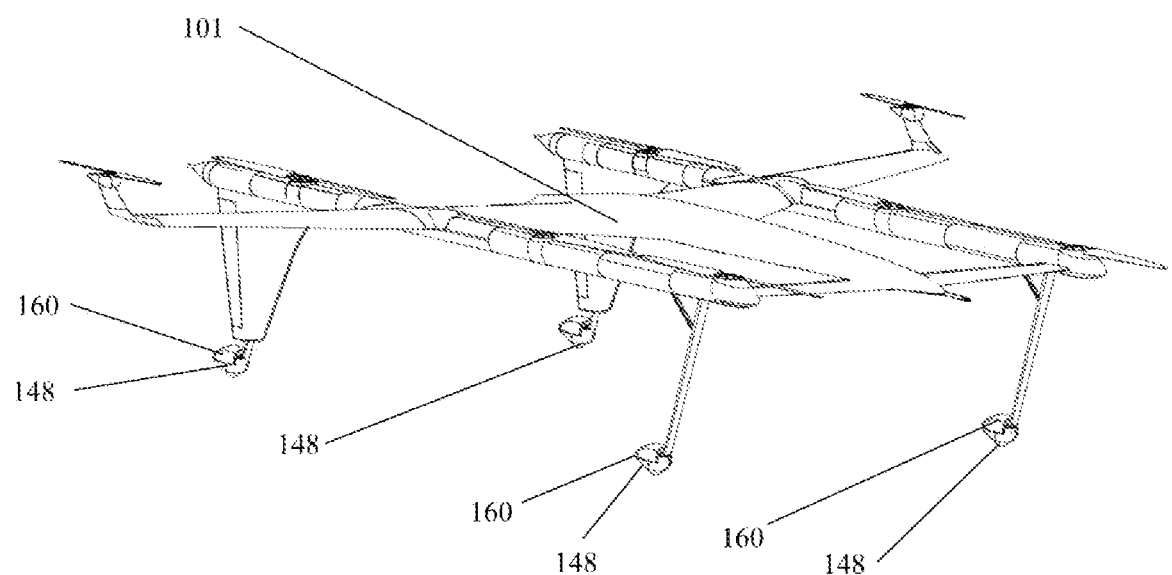
FIG. 33 is a perspective view of another embodiment of a flight platform without a propulsion propeller in accordance with another aspect of the embodiment.
Figure 34:
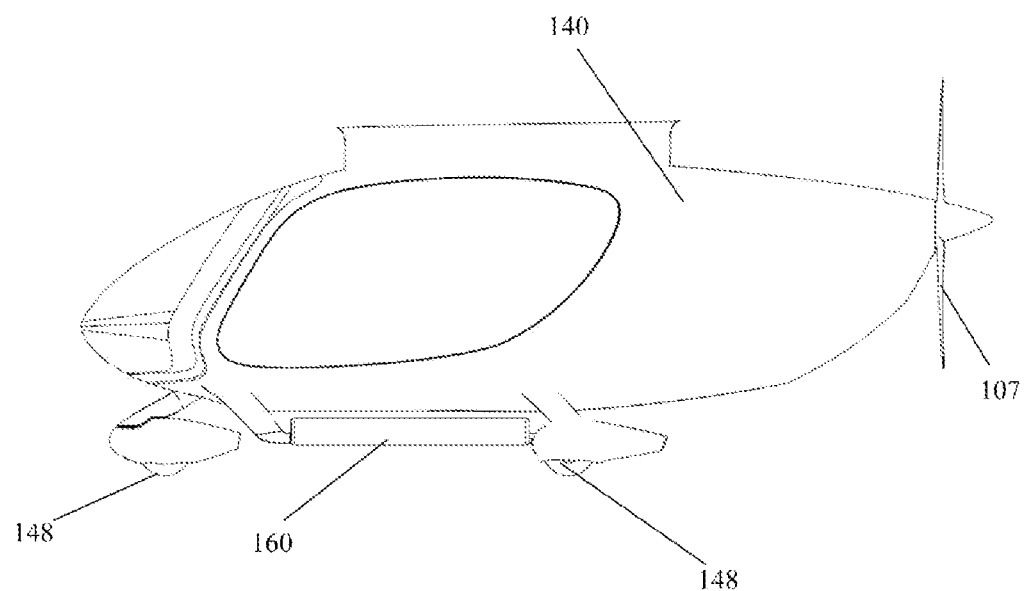
FIG. 34 is a side view of another embodiment of a passenger pod with a propulsion propeller in accordance with another aspect of the embodiment.
Figure 35:
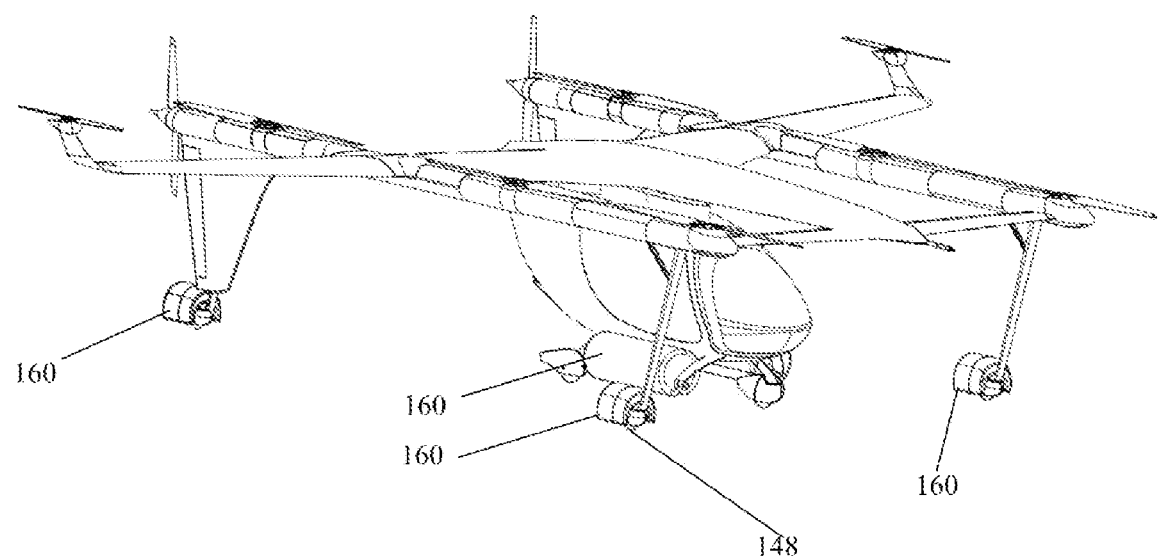
FIG. 35 is a perspective view of still another embodiment of a flight unmanned aircraft system, wherein six flotation devices are inflated.
Figure 36:
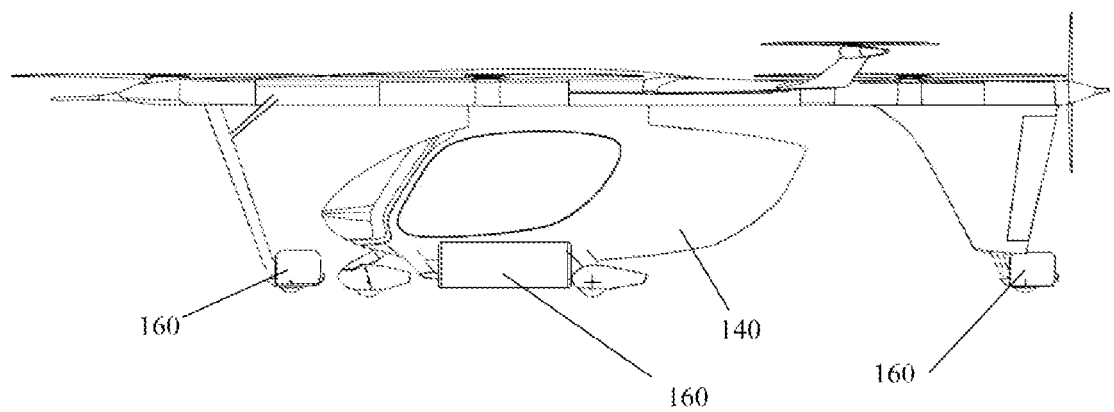
FIG. 36 is a side view of the aerial vehicle of FIG. 35.
Figure 37:
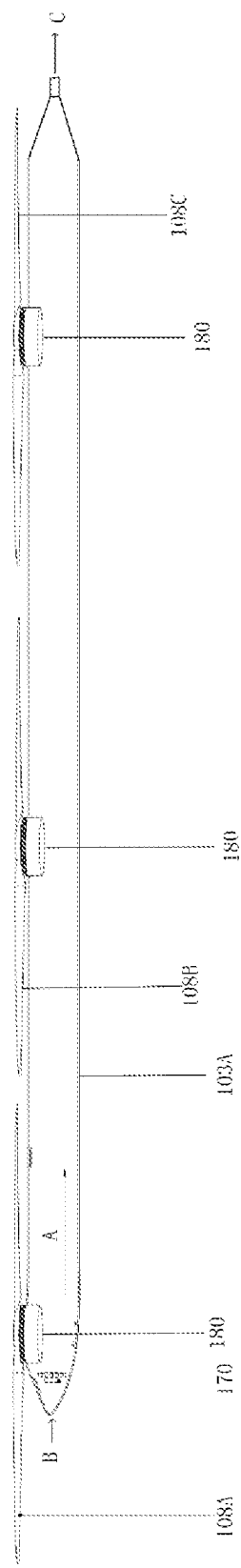
FIG. 37 is a side sectional view of an unmanned aerial vehicle with a cooling system in accordance with one aspect of an embodiment of the utility model.
Figure 38:
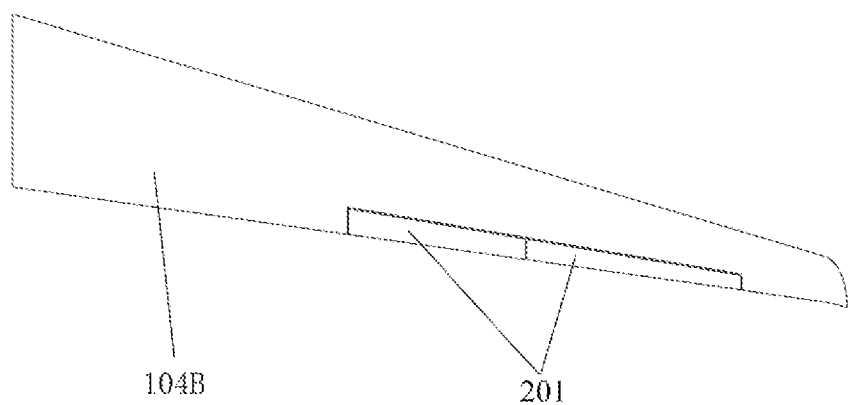
FIG. 38 is a view illustrating a configuration of ailerons of an unmanned aerial vehicle.

FIG. 1a is a top perspective view of an embodiment of a VTOL (vertical takeoff and landing) unmanned aircraft system with a flight platform and a fan in accordance with one aspect of an embodiment; FIG. 1b is a sectional view of a side portion of the unmanned aircraft system of FIG. 1a; FIG. 1c is a top perspective view of an embodiment of a VTOL unmanned aircraft system with a flight platform and a fan in accordance with still another aspect of an embodiment; FIG. 1d is a top perspective view of an embodiment of a VTOL unmanned aircraft system with a flight platform and a fan in accordance with still another aspect of the embodiment; FIG. 2 is a side view of air inlets and air outlets of an unmanned aircraft system in accordance with one aspect of an embodiment; FIG. 3 is a top perspective view of an embodiment of an unmanned aircraft system in accordance with still another aspect of an embodiment; FIG. 4 is a top rear perspective view of the unmanned aircraft system of FIG. 3; FIG. 5 is a side view of the unmanned aircraft system of FIG. 3; FIG. 6 is a top perspective view of another embodiment of a VTOL unmanned aircraft system with a flight platform and a detachably attached pod in accordance with one aspect of the embodiment; FIG. 7 is a top view of the unmanned aircraft system of FIG. 6 in accordance with one aspect of the embodiment; FIG. 8 is a front view of the unmanned aircraft system of FIG. 6 in accordance with one aspect of the embodiment; FIG. 9 is a top perspective view of an embodiment of a VTOL unmanned aircraft system with a flight platform and a detachably attached passenger pod in accordance with one aspect of the embodiment; FIG. 10 is a front view of the unmanned aircraft system of FIG. 9 in accordance with one aspect of the embodiment; FIG. 11 is a rear perspective view of the unmanned aircraft system of FIG. 9 in accordance with one aspect of the embodiment; FIG. 12 is a side perspective view of the unmanned aircraft system of FIG. 9 in accordance with one aspect of the embodiment, wherein a passenger pod is detached from the flight platform and parked on the ground; FIG. 13 is a rear perspective view of the embodiment of FIG. 9 in accordance with one aspect of the embodiment; FIG. 14 is a rear perspective view of another embodiment in accordance with one aspect of the embodiment; FIG. 15 is a side bottom perspective view of still another embodiment of an unmanned aircraft system in accordance with one aspect of the embodiment; FIG. 16 is a perspective view of one embodiment of an unmanned aircraft system in accordance with another aspect of the embodiment; FIG. 17 is a close-up view of an encircled region in FIG. 16 in accordance with another aspect of the embodiment; FIG. 18 is a side view of one embodiment of an unmanned aircraft system in accordance with another aspect of the embodiment; FIG. 19 is a front view of one embodiment of an unmanned aircraft system in accordance with another aspect of the embodiment; FIG. 20 is a rear view of one embodiment of an unmanned aircraft system in accordance with another aspect of the embodiment; FIG. 21 is an upward view of one embodiment of an unmanned aircraft system in accordance with another aspect of the embodiment; FIG. 22 is a perspective view of another embodiment of a flight platform in accordance with another aspect of the embodiment; FIG. 23 is a side view of another embodiment of a flight platform in accordance with another aspect of the embodiment; FIG. 24 is a front view of another embodiment of a flight platform in accordance with another aspect of the embodiment; FIG. 25 is a rear view of another embodiment of a flight platform in accordance with another aspect of the embodiment; FIG. 26 is an upward view of another embodiment of a flight platform in accordance with another aspect of the embodiment; FIG. 27 is a side view of another embodiment of a passenger pod in accordance with another aspect of the embodiment; FIG. 28 is a bottom perspective view of another embodiment of a passenger pod in accordance with another aspect of the embodiment; FIG. 29 is a front view of another embodiment of a passenger pod in accordance with another aspect of the embodiment; FIG. 30 is a rear view of another embodiment of a passenger pod in accordance with another aspect of the embodiment; FIG. 31 is an upward view of another embodiment of a passenger pod in accordance with another aspect of the embodiment; FIG. 32 is a side view of another embodiment of a flight platform attached to a cargo pod in accordance with another aspect of the embodiment; FIG. 33 is a perspective view of another embodiment of a flight platform without a propulsion propeller in accordance with another aspect of the embodiment; FIG. 34 is a side view of another embodiment of a passenger pod with a propulsion propeller in accordance with another aspect of the embodiment; FIG. 35 is a perspective view of still another embodiment of a flight unmanned aircraft system, wherein six flotation devices are inflated; FIG. 36 is a side view of the aerial vehicle of FIG. 35. FIG. 37 is a side sectional view of an unmanned aerial vehicle with a cooling system in accordance with one aspect of an embodiment of the utility model; and FIG. 38 is a view illustrating a configuration of ailerons of an unmanned aerial vehicle.

FIG. 1a is a top perspective view of an embodiment of a VTOL unmanned aircraft system with a flight platform and a fan in accordance with one aspect of an embodiment. FIG. 1b is a sectional view of a side portion of the unmanned aircraft system of FIG. 1a. An unmanned aerial vehicle 100 at least comprises: a left main wing 104A and a right main wing 104B; a left front wing 105A and a right front wing 105B; a main body 102 which is engaged with the left main wing 104A and the right main wing 104B; a left linear support 103A for connecting the left main wing 104A with the left front wing 105A; a right linear support 103B for connecting the right main wing 104B with the right front wing 105B; the left linear support 103A having a first group of multiple lift propellers 108A, 108B and 108C arranged thereon; the right linear support 103B having a second group of multiple lift propellers 108D, 108E and 108F arranged thereon; wherein the left linear support 103A and the right linear support 103B each have a hollow interior; at least one air inlet 190 which is provided on each of the left linear support 103A and the right linear support 103B; at least one air outlet 200 which is provided on each of the left linear support 103A and the right linear support 103B; and a fan 170 which is arranged in the hollow interior of each of the left linear support 103A and the right linear support 103B.

By adopting the unmanned aerial vehicle provided by the utility model, heat dissipation in an arm of the unmanned aerial vehicle is achieved by installing a fan in the hollow interior of each of a left linear support and a right linear support of the unmanned aerial vehicle, thereby achieving the purposes of lowering the temperature in the arm and protecting equipment in the arm.

FIG. 3 depicts an embodiment of a VTOL unmanned aerial vehicle 100 with a front wing configuration in general.

The various part features of the unmanned aerial vehicle 100 in the various embodiments shown in the accompanying drawings, which are illustrative only, may be flexibly combined to form an unmanned aerial vehicle with a new structure.

The unmanned aerial vehicle 100 in FIG. 3 may have two main wings 104A, 104B as a left main wing and a right main wing, and two front wings as a left front wing 105A and a right front wing 105B. The two main wings 104A, 104B and the two front wings 105A, 105B may be attached to a main body 102, wherein the main body may be positioned along a central longitudinal line of the unmanned aerial vehicle 100. The unmanned aerial vehicle 100 may also have a left linear support 103A arranged parallel to the main body 102, which may connect the left main wing 104A to the left front wing 105A. Similarly, the unmanned aerial vehicle 100 may also have a right linear support 103B arranged parallel to the main body 102, which may connect the right main wing 104B to the right front wing 105B. Wherein the front wings of the unmanned aerial vehicle mainly control a flight attitude of the unmanned aerial vehicle during the flight period, such as controlling the pitch of the unmanned aerial vehicle. The main wings of the unmanned aerial vehicle, acting as the largest wings at the two sides of a fuselage, are usually used for generating lift to support the unmanned aerial vehicle to fly in the air, and meanwhile, certain stabilization and manipulation effects are achieved.

In one embodiment, the unmanned aerial vehicle 100 may also not have the front wing configuration. Illustratively, the unmanned aerial vehicle 100 may have two main wings as a left main wing and a right main wing, and two ailerons as a left aileron and a right aileron, all of which are engaged together to form a flight platform.

In one embodiment, as shown in FIG. 38, the aileron 201 of the unmanned aerial vehicle may be arranged at the rear side of the main wing 104B, there may be at least one aileron, preferably two, which is in a sheet-like configuration, and capable of moving up and down to control the roll of the aircraft.

The left linear support 103A and the right linear support 103B are expected to improve the structural integrity of the unmanned aerial vehicle 100. In other embodiments, the left linear support 103A and the right linear support 103B may accommodate driving motors (not shown) for driving each lift propeller 108A, 108B, 108C, 108D, 108E, and 108F. Thus, the left linear support 103A and the right linear support 103B may be used for fixing the lift propellers to reduce usage of the parts of the unmanned aerial vehicle, and while simplifying structural parts of the unmanned aerial vehicle, the overall strength of the unmanned aerial vehicle may be improved due to the engagement of the left linear support 103A and the right linear support 103B with the two front wings and the two main wings. As will be disclosed later, the left linear support 103A and the right linear support 103B may also accommodate folding legs 111, each of which may be retracted into the left linear support 103 A and the right linear support 103B.

In one possible embodiment, two ends of each of the left linear support 103 A and the right linear support 103B are formed as a tapered structure. Preferably, the apex of the tapered structure at each end part of the left linear support 103A is located on the axis of the left linear support 103A, and the apex of the tapered structure at each end part of the right linear support 103B is located on the axis of the right linear support 103B. It is easy to understand that resistance of air to the linear supports in the flight process of the unmanned aerial vehicle 100 may be reduced by forming two ends of each of the left linear support 103A and the right linear support 103B as the tapered structure, and thus the cruising ability of the unmanned aerial vehicle 100 is improved. The embodiment is not intended to limit an included angle between a generatrix and the axis of the tapered structure, and those skilled in the art may set the included angle according to actual needs.

In one embodiment, the left linear support 103A and the right linear support 103B are attached to the distal ends of the left front wing 105A and the right front wing 105B respectively. In still another embodiment, the left linear support 103A and the right linear support 103B extend beyond the front wings 105A, 105B.

In one embodiment, the left linear support 103A and the right linear support 103B are attached to positions near the middle portions of the left main wing 104A and the right main wing 104B respectively. In still another embodiment, the left linear support 103A and the right linear support 103B extend beyond the main wings 104A, 104B along a backwards direction.

The left linear support 103A is expected to be relative narrow in diameter, and may have a first group of multiple lift propellers 108A, 108B, 108C arranged at the top side, the bottom side, or both, of the left linear support 103A. In one feasible embodiment, these lift propellers 108A, 108B, 108C may be driven by low profile motors arranged in the hollow interior of the left linear support 103A. In an embodiment shown in FIG. 3, the lift propellers 108A, 108B, 108C are only arranged at the top side of the left linear support 103A. It should be noted that the number of the lift propeller shown in the figure is for illustrative purpose only, the utility model is not intended to limit the number of the lift propeller, and the lift propeller may be increased or decreased according to the demand in actual. Likewise, the right linear support 103B is expected to be relative narrow in diameter, and may have a second group of multiple lift propellers 108D, 108E, and 108F arranged on the top side, the bottom side, or both, of the right linear support 103B. In one feasible embodiment, these lift propellers 108D, 108E, 108F may be driven by low profile motors arranged in the hollow interior of the right linear support. In an embodiment shown in FIG. 3, the lift propellers 108D, 108E, 108F are only arranged at the top side of the right linear support 103B. It should be noted that the number of the lift propeller shown in the figure is for illustrative purpose only, the utility model is not intended to limit the number of the lift propeller, and the lift propeller may be increased or decreased according to the demand in actual.

In one embodiment, the left linear support 103A has at least one air inlet and at least one air outlet which are provided thereon. Illustratively, referring to FIG. 2, at least one air inlet 190 and at least one air outlet 200 may be provided at the front end and the rear end of the left linear support 103A respectively, thereby allowing air to enter the hollow interior of the left linear support 103A from an external environment. The at least one air inlet and the at least one air outlet may be flexibly provided, for example, in addition to that the air inlet may be provided at a position near the front end of the left linear support 103A and the air outlet may be provided at a position near the rear end of the left linear support 103A, the air inlet and the air outlet may also be provided at the side faces (the top face, the bottom face, the left side face and the right side face) of the left linear support 103A, and the utility model is not intended to limit the providing of the air inlet and the air outlet. In one embodiment, a diameter or width of each air inlet in the at least one air inlet is less than a radius of the left linear support 103A. It should be noted that the air inlets and the air outlets shown in FIG. 2 are for illustrative purpose only, the utility model is not intended to limit the shape and number of the air inlet and the air outlet, and the air inlet and the air outlet may be flexibly provided according to the demand in actual.

Preferably, the air inlets 190 are located at the front ends of the left linear support 103A and the right linear support 103B, and the air outlets 200 are located at the rear ends of the left linear support 103A and the right linear support 103B. It should be understood by those skilled in the art that the air flows into the hollow interiors from the air inlets 190 at the front ends of the left and right linear supports 103A, 103B and flows out of the air outlets 200 at the rear ends of the left and right linear supports 103A, 103B, thereby dissipating heat from the left linear support 103A and the right linear support 103B as a whole to prevent the interiors of the left linear support 103A and the right linear support 103B from excessive local temperatures.

One possible implementation is that, the two ends of each of the left linear support 103A and the right linear support 103B are of a tapered structure, the air inlets 190 are located at the front ends of the left linear support 103A and the right linear support 103B, and the air outlets 200 are located at the rear ends of the left linear support 103A and the right linear support 103B. At the moment, the shapes of the air inlet 190 and the air outlet 200 may be provided in an oblong, a length direction of the oblong is arranged along a generatrix of the tapered structure, a spacing is provided between adjacent air inlets 190, and a spacing is provided between adjacent air outlets 200. It should be understood by those skilled in the art that providing the shapes of the air inlet 190 and the air outlet 200 to be the oblong may avoid the causing of large influence on the structural strength of the left linear support 103A and the right linear support 103B on the basis of guaranteeing air intake and exhaust of the left linear support 103A and the right linear support 103B.

Further, a fan is arranged in the hollow interior of the left linear support 103A to force the air from the air inlet to reach the air outlet through the hollow interior. In one embodiment, the fan may be arranged at a position near the front end of the left linear support 103A. In one embodiment, a rotating shaft of the fan is perpendicular to a rotating shaft of each of the lift propellers 108A, 108B, 108C in the plurality of lift propellers.

Specifically, as shown in FIG. 3, taking the left linear support 103A as an example, in the interior space of the left linear support 103A, a cooling fan 170 is arranged below a lift motor 180 of the lift propeller 108A and in front of the left linear support 103A, and a wind field of the cooling fan 170 blows towards the rear portion of the left linear support 103A to form an airflow flowing backwards in the left linear support 103A, thereby facilitating the utilization of the airflow in the flight process of the unmanned aerial vehicle and accelerating the heat dissipation. After the takeoff and landing unmanned aerial vehicle is shifted to a level flight stage, the lift motor stops working, and the cooling fan stops working at the same time. In one embodiment, the right linear support 103B has at least one air inlet (not shown) and at least one air outlet (not shown) which are provided thereon, but may be similarly provided as shown in FIG. 2, thereby allowing the air to enter the hollow interior of the right linear support 103B from the external environment; the at least one air inlet and the at least one air outlet may be flexibly provided, for example, the air inlet may be provided at a position near the front end of the right linear support 103B, while the air outlet may be provided at a position near the rear end of the right linear support 103B, or the air inlet and the air outlet may be provided at side faces (top face, bottom face, left and right side faces) of the right linear support 103B. Wherein a diameter or width of each air inlet in the at least one air inlet is less than a radius of the right linear support 103B. The air inlet and the air outlet of the right linear support 103B may be similarly provided with reference to FIG. 2; and likewise, the shapes and the number of the air inlet and the air outlet are not limited thereto.

Further, a fan is arranged in the hollow interior of the right linear support 103B to force air from the air inlet to reach the air outlet through the hollow interior. In one embodiment, the fan is arranged at the position near the front end of the right linear support 103B. In one embodiment, a rotating shaft of the fan is perpendicular to a rotating shaft of each lift propeller 108D, 108E, 108F in the plurality of lift propellers. The fan may be correspondingly arranged in the right linear support 103B similarly as shown in FIG. 3.

By installing the cooling fans in the left linear support 103A and the right linear support 103B of the unmanned aerial vehicle respectively, the cooling fans start to work while lift motors of the unmanned aerial vehicle work, the hot airflow in the arms (i.e., the left linear support and the right linear support) is exhausted through flow fields generated by the cooling fans, thereby achieving the purposes of lowering the temperature in the arms and protecting equipment in the arms.

In one embodiment, the diameter or width of each air inlet in the at least one air inlet is less than the radius of each of the left linear support and the right linear support. The providing of the diameter or width of the air inlet and the air outlet are beneficial to maintaining stability of the unmanned aerial vehicle in the flight process, and the situation that the normal flight of the unmanned aerial vehicle is affected due to unstable airflow in the unmanned aerial vehicle caused by overlarge openings is prevented.

In one embodiment, the unmanned aerial vehicle further comprises a detachable pod attached to the bottom face of the unmanned aerial vehicle, wherein the pod is a passenger pod or a cargo pod. By means of the arrangement mode as above, a structure of the unmanned aerial vehicle may be flexibly adjusted; in accordance with the actual conditions, the pod may be installed when needed, and may be detached when not needed, and therefore the unmanned aerial vehicle may be flexibly used in response to different requirements, and the adaptability of the unmanned aerial vehicle is improved.

In one embodiment, the rotating shaft Y of the fan 170 is perpendicular to the rotating shaft X of each lift propeller 108A of the plurality of lift propellers, such arrangement makes cooling fan blades of the fan be perpendicular to propeller blades of the unmanned aerial vehicle, as shown in FIG. 1B. Airflow A generated by rotation of the fan 170 horizontally flows backwards in the linear support; in situations where the fan is not arranged in such a way, the airflow A in the hollow interior can be influenced by the inner surface of the arm and thus cannot flow through the hollow interior as quickly as possible to take away the heat.

In one embodiment, the left linear support 103A and the right linear support 103B may both be in a straight configuration which is in favor of improving the overall strength of the unmanned aerial vehicle.

In one embodiment, the main wing and the aileron of the unmanned aerial vehicle 100 may be configured as a front wing configuration. As shown in FIG. 38 and the rest accompanying drawings showing the front wing configuration, the main wing and aileron may be a plate-like configuration of the main wing.

In one embodiment, the unmanned aerial vehicle 100 may have at least one propulsion propeller 100 to propel the unmanned aerial vehicle 100 in a forward direction. In various embodiments as shown in FIGS. 1c, 1d and 3, there may be two propulsion propellers 107A, 107B. The two propulsion propellers 107A, 107B may be arranged at the distal ends at the rear portions of the linear supports 103A, 103B.

In still another embodiment, such as an embodiment shown in FIG. 33, a flight platform 101 may not have a propulsion propeller. In such embodiment, the flight platform 101 may be attached to a passenger pod or a cargo pod which is provided with the propulsion propeller. FIG. 34 illustrates an embodiment of a passenger pod having a propulsion propeller arranged at the rear end thereof. When the passenger pod is attached to the flight platform 101 of FIG. 33, the propulsion propeller propels the flight platform 101 forwards.

In one embodiment, two vertical stabilizers 106A, 106B may be arranged at positions near the rear ends of the linear supports 103A, 103B respectively. Although the vertical stabilizers are shown pointing downward, there may have embodiments in which the vertical stabilizers point upward.

In another embodiment, as shown in FIG. 1*d* and FIG. 3, the main wings 104A, 104B may be respectively provided with wingtip lift propellers 109A, 109B arranged at the distal ends thereof. This may be achieved by providing the wingtip vertical stabilizers 110A, 110B at the distal ends of the main wings 104A, 104B, respectively, and having the lift propellers 109A, 109B arranged at the upper tips of the wingtip vertical stabilizers 110A, 110B. These wingtip lift propellers 109A, 109B may be relatively smaller than the lift propellers arranged on the linear supports 103A, 103B.

These wingtip lift propellers 109A, 109B may be used for efficiently and effectively controlling the roll of the unmanned aerial vehicle 100. These wingtip lift propellers 109A, 109B are located at the most distal positions away from the center axis of the unmanned aerial vehicle 100 and are effective in regulating the roll of the unmanned aerial vehicle 100, and may do so with a diameter less than those of the other lift propellers.

As further shown in FIG. 3, there is a pod 130 normally attached beneath the main body 102 of the unmanned aerial vehicle 100.

Now referring to details in FIG. 4, the unmanned aerial vehicle 100 is expected to use any type of landing gear. In one embodiment, the unmanned aerial vehicle 100 may have four single leaf springs 112A, 112B, 112C, 112D as the landing gears. The front two single leaf springs 112A, 112C are respectively arranged at the distal ends of folding legs 111A, 111B. During the flight, the folding legs 111A, 111B may be respectively retracted into interior spaces of the left linear support 103A and the right linear support 103B.

In one embodiment, the tail ends of the landing gears of the unmanned aerial vehicle may be provided with leaf springs as shown in FIG. 1*a* to FIG. 15, or the tail ends of the landing gears of the unmanned aerial vehicle may be provided with electric wheels as shown in FIG. 16 to FIG. 36.

The two single leaf left springs 112B, 112D at the rear side are expected to be respectively arranged at the distal ends of the bottoms of the vertical stabilizers 106A, 106B.

The expected single leaf springs 112A, 112B, 112C, 112D may be made of appropriate materials to provide enough elasticity and integrity, the materials comprise natural and synthetic polymers, various metals and metallic alloy, natural materials, textile fibers, and all reasonable combination thereof. In one embodiment, carbon fibers are used.

Now turning to FIG. 5, a pod used as a cargo pod 130 is illustrated. The cargo pod 130 may have single leaf springs 135A, 135B, 135C, 135D as landing gears thereof. Or, the cargo pod 130 may have other type of landing gear, for example, sliding rails, legs, and wheels.

In an expected embodiment, the cargo pod 130 may be detached from the other portion of the unmanned aerial vehicle 100. The other portion of the unmanned aerial vehicle may be called as a flight platform 101. The flight platform 101 may fly without carrying the pod, and may interchangeably carry different pods. As will be described later, the flight platform 101 may carry a passenger pod.

In an illustrated example, all pods 130, 140 may be carried beneath the flight platform 101. The pods 130, 140 are expected to be loaded on the ground, and the loading process may be completed before or after attaching the flight platform 101 to the pods 130, 140.

FIG. 7 illustrates a top view of a flight platform 101. The flight platform 101 may have a generally flat configuration, and capable of carrying a load therebelow or thereabove. During high-speed flight, all six lift propellers 108A, 108B, 108C, 108D, 108E, 108F may be locked in place, and thus each blade is parallel to the main body 102.

FIG. 7 illustrates one embodiment of the flight platform 101, wherein the length of each of the front wings 105A, 105B is not longer than a half of that of each of the main wings 104A, 104B.

FIG. 8 depicts a front view of a flight platform 101 with a detachably attached cargo pod 130 in general. Whether the cargo pod 130, the passenger pod 140, or any other type of load, it is specifically expected that there may be an energy storage unit 150 arranged in the main body 102 of the flight platform. Stored energy may be used to power the other parts of the flight platform, such as the lift propellers 108A, 108B, 108C, 108D, and the propulsion propellers 107A, 107B. The stored energy may be electric power, and the storage unit is a battery. In another embodiment, the energy storage 150 may be used to power accessories in the pods 130, 140.

These batteries 150 may also be arranged in the other portions of the flight platform 101, such as in the linear supports 103A, 103B.

Alternatively or preferably, there may be energy storage units 155 arranged in the pods 130, 140. Energy stored in the storage units 155 may be used to power the lift propellers 108A, 108B, 108C, 108D, and propulsion propellers 107A, 107B. The stored energy may be electric power, and the storage unit is a battery. By arranging the energy storage units 155 in the pods 130, 140, whenever the flight platform 101 is attached to new pods 130, 140, the flight platform 101 will have a supplemental energy source. The flight platform 101 itself may be an emergency energy store or a battery 150 with smaller capacity to supply power to the flight platform 101 for a relatively short period of time when the flight platform 101 is in flight without the pods 130, 140. In one embodiment, the main power supply of the flight platform 101 is from the batteries 150 located in the pods 130, 140. In this way, the flight platform 101 or the entire VTOL unmanned aircraft system 100 will have a fully charged energy source when the flight platform 101 replaces the old pods 130, 140 with the new pods 130, 140. This is a beneficial method without requiring the VTOL unmanned aerial vehicle to charge itself. In a preferred embodiment, the flight platform 101 may work/fly continuously for hours or even days to attach the cargo pod/passenger pod and detach the cargo pod/passenger pod without stopping to charge batteries thereof.

Now referring to the details of FIG. 9, a passenger pod 150 is provided. The passenger pod 150 may use any type of landing gear, such as rigid legs 145A, 145B, 145C, 145D as shown in the figure.

FIG. 12 depicts one aspect of the utility model in general, wherein a pod (whether a cargo pod or a passenger pod) is detachable. Here, the passenger pod 140 may be selectively detached from the flight platform 101. The engagement and disengagement between the flight platform 101 and the pod 140 may be autonomously executed (without simultaneous user intervention) by a computer and/or other sensors and a calculation device. Alternatively or preferably, a user may actively control and guide the engagement and disengagement between the flight platform 101 and the pod 140.

As will be recognized by those of ordinary skill in the art, various types of engagement mechanisms 147 may be used to fix the pod 140 to the flight platform 101. For example, the engagement mechanism may be a mechanical latch, a magnetic latch, a track and groove, or a combination of any known engagement ways.

It is important to understand that, in addition to having two propulsion propellers 107A and 107B (as shown in FIG. 13), alternatively or alternatively, there may be a central propulsion propeller 117 which is connected to the rear end of the main body 102 (as shown in FIG. 14). As shown in FIG. 14, the central propulsion propeller 117 is engaged to the rear end of the main body 102 through a vertical expander 116. The vertical expander 116 may be any structure in any shape to physically engage with the propulsion propeller 117, thereby making a rotating center of the propulsion propeller 117 perpendicularly deviate from the main body 102. In still another embodiment, the propulsion propeller 117 perpendicularly deviates from the main body 102, thereby making the rotating center of the propulsion propeller 117 be perpendicularly located at a position at the rear portion of the pod 140 or be perpendicularly flushed with the pod 140. In another embodiment, the propulsion propeller 117 is perpendicularly flushed with the top of the pod 140. In another embodiment, the propulsion propeller 117 is perpendicularly flushed with the middle portion of the pod 140. In a further embodiment, the propulsion propeller 117 is perpendicularly flushed with the bottom of the pod 140.

What is not shown in any figure of the embodiment is the absence of the propulsion propellers 107A, 107B at the end parts of the linear supports 103A, 103B respectively. Instead, there may only be one propulsion propeller 117 engaged with the rear end of the main body 102.

It may also be contemplated that each of the linear supports 103A, 103B may comprise more than three lift propellers, which may be achieved by providing a longer linear support to accommodate more lift propellers, by using a lift propeller with smaller diameter, or by placing lift propellers on both the top and bottom sides of the linear support. One embodiment is illustrated in FIG. 15, wherein two additional lift propellers 108G 108H are arranged at the front ends of the bottoms of the linear supports 103A, 103B.

Although the propulsion propellers 107A, 107B have been illustrated in the foregoing figures to be positioned at the distal ends of the rear portions of the linear supports 103A, 103B, it is particularly expected that these propulsion propellers 107A, 107B may be arranged at a horizontal plane lower than the main wings 104A, 104B, as those shown in FIG. 15. In one aspect, these propulsion propellers 107A, 107B may be arranged at a horizontal plane which is basically equal to pods 130, 140 carried by the flight platform. In another aspect, these propulsion propellers 107A, 107B may be arranged at the middles of the vertical stabilizers 106A, 106B. One expected reason for lowering the arrangement of the propulsion propellers 107A, 107B is to minimize head dipping effect during the flight, which may be caused by aerodynamic effects caused by the pods 130, 140.

FIG. 16 to FIG. 32 illustrate an embodiment in which a flight platform 101 or pods 130, 140, or both, may each have electric wheels 148 attached thereto. In an embodiment of FIG. 16, the flight platform 101 is provided with the electric wheels 148; and each of the pods 130, 140 is also provided with the electric wheels. Now referring to an embodiment of the FIG. 17, single electric wheel 148 unit may have a motor enclosed in a shell 149, and the motor may be driven by the power supplied by the energy storage unit 150 arranged in each of the pods 130, 140.

It is contemplated that the electric wheels 148 may enable the flight platform 101 or the pod 130 to move on the ground when the flight platform and the pod are parked on the ground. This allows the one of pods 130, 140 to move away from the flight platform 101 and allows another of the pods 130, 140 to move itself to the flight platform 101 for engagement.

Or, this may allow the flight platform 101 to be away from the pod 130 and to move towards another pod for engagement. In one embodiment, each of the pods 130, 140 may have an energy storage unit 155, and therefore, an energy source of the flight platform 101 is substantially supplemented when the flight platform 101 is engaged with the new and fully charged pods 130, 140.

In certain embodiments of the disclosed unmanned aircraft system, at least one flotation device 160 may be provided, which is engaged with at least one of the cargo pod 130, the passenger pod 140, and the flight platform 101. The flotation device may be of the type that requires actuation, that is, active inflation with gas or through material when needed. In other words, in this particular embodiment, the flotation device 160 may remain in a deflated state and may expand only when the inflation is triggered at certain conditions. For example, the flotation device 160 may automatically inflate during emergency landing, may automatically inflate when landing on water, and may inflate when any landing gear fails in certain aspects.

Many known types of inflation mechanisms or airbag mechanisms may be implemented to achieve the needs and configuration of the disclosed flotation device 160. The expected flotation device 160 may be of a type that can be repeatedly reused, re-inflated, and re-deflated. The expected flotation device 160 may be merely disposable.

Alternatively or preferably, an inflation behavior may be activated by a user. For example, when an operator of the unmanned aircraft system determines that the flotation device 160 needs to be inflated, he or she may send a signal to start the inflation.

It should be particularly noted in certain embodiments that the flotation device 160 does not need the electric wheel 148. In other embodiments, the flotation device 160 is a part of a shell of the electric wheel 148.

Referring to FIG. 28 as one example, a passenger pod 140 may have a lengthened type flotation device 160 arranged on any side of the pod 140, which may be used as a water landing gear. In FIG. 28, these flotation devices 160 are shown deflated. FIG. 34 illustrates a side view of a deflated flotation device 160. As shown in FIG. 35 and FIG. 36, the flotation device 160 engaged with the passenger pod 140 is shown inflated.

Referring FIG. 33 as another example, the flight platform 101 may have four flotation devices 160 arranged on the tops of four electric wheels 148 respectively. These flotation devices 160 may be alternatively attached to the electric wheels 148 or close to the electric wheels 148 at the other positions. In FIG. 33, these flotation devices 160 engaged with the electric wheels 148 are shown deflated. FIG. 35 and FIG. 36 illustrate inflated flotation devices 160 of the flight platform 101.

As above, a cooling fan is installed in an arm of an unmanned aerial vehicle, the cooling fan starts to work during the working period of a lift motor of the unmanned aerial vehicle, and hot airflow in the arm is exhausted through a flow field generate by the cooling fan, thereby achieving the purposes of lowering temperature in the arm and protecting equipment in the arm. Illustratively, one cooling fan is arranged below and in front of the lift motor, a wind field of the cooling fan blows towards the rear portion of the arm to form an airflow flowing backwards in the arm, and when the vertical takeoff and landing unmanned aerial vehicle is shifted to a level flight stage, the lift motor stops working, and the cooling fan stops working at the same time.

According to the technical solutions of the utility model, heat dissipation in an arm of an unmanned aerial vehicle is achieved by installing a fan in a hollow interior of each of a left linear support and a right linear support of the unmanned aerial vehicle, thereby achieving the purposes of lowering temperature in the arm and protecting equipment in the arm.

FIG. 37 is a side sectional view of an unmanned aerial vehicle with a cooling system in accordance with an embodiment of the utility model. Please referring to FIG. 37, a cooling system for an unmanned aerial vehicle provided by the utility model comprises a hollow linear support 103A; a plurality of lift propellers 108A, 108B, and 108C which are arranged on the hollow linear support 103A; a plurality of motors 180 for driving the lift propellers 108A, 108B, and 108C, wherein the motors 180 are arranged in the hollow linear support 103A, and illustratively, each motor 180 is used for driving one lift propeller; at least one air inlet and air outlet (not shown), wherein air enters from the air inlet near the front end of the linear support 103A and flows out from the air outlet near the rear end thereof; and a fan 170 which is arranged in the linear support 103A to supply the air from an external environment to the interior of the hollow linear support.

In one embodiment, the fan is arranged at a position close to the front end of the linear support, and thus airflow A in the linear support may flow through the linear support more quickly to take away all heat in the hollow interior more quickly.

In one embodiment, the linear support is in a straight configuration which is in favor of improving the overall strength of the unmanned aerial vehicle.

In one embodiment, at least one air inlet is provided at a position close to the front end of the linear support, which is in favor of enabling the air caused by the flight movement during the flight of the unmanned aerial vehicle to enter the linear support more quickly.

In one embodiment, at least one air outlet is provided at a position close to the rear end of the linear support, and thus the airflow in the linear support may cover the entire interior of the linear support, and the heat dissipation of the entire interior of the linear support is achieved.

In one embodiment, the cooling system further comprises a pod which is detachably attached to the bottom face of the unmanned aerial vehicle, wherein the pod is a passenger pod or a cargo pod. By means of the arrangement mode as above, a structure of the unmanned aerial vehicle may be flexibly adjusted; in accordance with the actual conditions, the pod may be installed when needed, and may be detached when not needed, and therefore the unmanned aerial vehicle may be flexibly used in response to different requirements, and the adaptability of the unmanned aerial vehicle is improved.

The heat dissipation in the arm of the unmanned aerial vehicle may be achieved by adopting the cooling system for the unmanned aerial vehicle provided by the utility model.

Many variations and modifications may be made by those of ordinary skill in the art without departing from the spirit and scope of the disclosed embodiments. Thus, it must be understood that the illustrated embodiments are presented for the purpose of example only and should not be taken as limiting the embodiments defined by the appended technical solutions. For example, despite the fact that elements of the technical solutions are presented below in a certain combination, it must be expressly understood that the embodiment comprises other combinations of less, more or different elements, which are disclosed herein, even if such a combination is not initially defined.

Therefore, detailed embodiments and applications of a VTOL flight platform with interchangeable pods have been disclosed. However, it is apparent to those skilled in the art that more modifications in addition to those already described are possible without departing from the concepts disclosed herein. Thus, the disclosed embodiments are not limited except in the spirit of the appended technical solutions. In addition, in interpreting the specification and technical solutions, all terms should be interpreted as the broadest possible manner consistent with the context. Particularly, the terms "comprise" and "comprising" should be interpreted as referring to components, assemblies, or steps in a non-exclusive manner, indicating that the referenced components, assemblies, or steps may be present, or utilized, or combined with other components, assemblies, or steps that are not expressly referenced. Insubstantial variations from the claimed subject matter now known or later expected by those of ordinary skill in the art are expressly expected to be equivalent within the scope of the technical solutions. Thus, obvious replacements which are known at present or later to those of ordinary skill in the art are defined to be within the scope of the defined elements. Thus, the technical solutions should be understood to encompass what is specifically illustrated and described above, what is conceptually equivalent, what may be obviously replaced, and what essentially comprise the basic idea of the embodiments. In addition, in the case that the specification and technical solutions refer to at least one selected from a group consisting of A, B, C, . . . and N, the text should be interpreted as requiring at least one element of the group, including N, rather than A plus N, or B plus N, or the like.

What is claimed is:

1. A vertical takeoff and landing unmanned aerial vehicle, comprising: a left main wing and a right main wing; a left front wing and a right front wing; a main body which is engaged with the left main wing and the right main wing; a left linear support for connecting the left main wing with the left front wing; a right linear support for connecting the right main wing with the right front wing; the left linear support having a first group of multiple lift propellers arranged thereon; the right linear support having a second group of multiple lift propellers arranged thereon; wherein the left linear support and the right linear support each have a hollow interior; at least one air inlet which is provided on each of the left linear support and the right linear support; at least one air outlet which is provided on each of the left linear support and the right linear support; and a fan which is arranged in the hollow interior of each of the left linear support and the right linear support; and wherein a rotating shaft of the fan is perpendicular to a rotating shaft of each lift propeller in the first and second groups of multiple lift propellers, wherein the air inlets are located at front ends of the left linear support and the right linear support, and the air outlets are located at rear ends of the left linear support and the right linear support; wherein the two ends of each of the left linear support and the right linear support are formed as a tapered structure and said air inlets each has an oblong shape, length-wise directions of the air inlets are provided along a generatrix of the tapered structure.

2. The vertical takeoff and landing unmanned aerial vehicle according to claim 1, wherein the fan is arranged at a position proximate to the front end of each of the left linear support and the right linear support.

3. The vertical takeoff and landing unmanned aerial vehicle according to claim 2, further comprising a plurality of motors which are arranged in the hollow interiors.

4. The vertical takeoff and landing unmanned aerial vehicle according to claim 3, wherein a diameter or width of each air inlet in the at least one air inlet is less than a radius of each of the left linear support and the right linear support.

5. The vertical takeoff and landing unmanned aerial vehicle according to claim 1, further comprising a detachable pod attached to the bottom face of the unmanned aerial vehicle.

6. The vertical takeoff and landing unmanned aerial vehicle according to claim 5, wherein the pod is a passenger pod or a cargo pod.

7. The vertical takeoff and landing unmanned aerial vehicle according to claim 1, further comprising at least one propulsion propeller arranged on the unmanned aerial vehicle.

8. A cooling system for an unmanned aerial vehicle, comprising: a hollow linear support; a plurality of lift propellers which are arranged on the linear support; a plurality of motors for driving the lift propellers, wherein each motor is used for driving one lift propeller, and the plurality of motors are arranged in the linear support; at least one air inlet which is provided on the linear support; at least one air outlet which is provided on the linear support; a fan which is arranged in the linear support to supply air from an external environment to an interior of the hollow linear support; wherein a diameter or width of each air inlet in the at least one air inlet is less than a radius of the linear support; wherein a rotating shaft of the fan is perpendicular to a rotating shaft of each lift propeller in the plurality of lift propellers, wherein the at least one air inlet is provided at a position proximate to a front end of the linear support; wherein the at least one air outlet is provided at a position proximate to a rear end of the linear support; wherein the two ends of the linear support are formed as a tapered structure and said at least one air inlet has an oblong shape, length-wise direction of the at least one air inlet is provided along a generatrix of the tapered structure.

9. The cooling system for the unmanned aerial vehicle according to claim 8, wherein the fan is arranged at a position proximate to the front end of the linear support.

10. The cooling system for the unmanned aerial vehicle according to claim 9, wherein the linear support is in a straight configuration.

* * * * *